United States Patent
Kato

(10) Patent No.: US 12,174,021 B2
(45) Date of Patent: Dec. 24, 2024

(54) MEASUREMENT ACCURACY CALCULATION DEVICE, SELF-POSITION ESTIMATION DEVICE, CONTROL METHOD, PROGRAM AND STORAGE MEDIUM

(71) Applicant: PIONEER CORPORATION, Tokyo (JP)

(72) Inventor: Masahiro Kato, Kawagoe (JP)

(73) Assignee: PIONEER CORPORATION, Tokyo (JP)

(*) Notice: Subject to any disclaimer, the term of this patent is extended or adjusted under 35 U.S.C. 154(b) by 523 days.

(21) Appl. No.: 17/272,920

(22) PCT Filed: Oct. 7, 2019

(86) PCT No.: PCT/JP2019/039479
§ 371 (c)(1),
(2) Date: Mar. 2, 2021

(87) PCT Pub. No.: WO2020/085062
PCT Pub. Date: Apr. 30, 2020

(65) Prior Publication Data
US 2021/0278217 A1    Sep. 9, 2021

(30) Foreign Application Priority Data
Oct. 24, 2018   (JP) .............................. 2018-200067

(51) Int. Cl.
*G01C 21/14* (2006.01)
*G01C 21/16* (2006.01)
*G01C 21/28* (2006.01)

(52) U.S. Cl.
CPC ........... *G01C 21/14* (2013.01); *G01C 21/165* (2013.01); *G01C 21/28* (2013.01)

(58) Field of Classification Search
CPC ...... G01C 21/12; G01C 21/14; G01C 21/165; G01C 21/28; G01C 21/3476
See application file for complete search history.

(56) References Cited

U.S. PATENT DOCUMENTS

| 11,016,499 B2 * | 5/2021 | Kato ................ B60W 40/105 |
| 2009/0228204 A1 | 9/2009 | Zavoli et al. |

(Continued)

FOREIGN PATENT DOCUMENTS

| CN | 105718860 A | * | 6/2016 | ......... G06K 9/00818 |
| CN | 108292141 A | * | 7/2018 | ........... B64C 39/024 |

(Continued)

OTHER PUBLICATIONS

European Patent Office, Extended European Search Report, Application No. 19876435.9 dated Jul. 8, 2022, in 13 pages.

(Continued)

*Primary Examiner* — Natalie Huls
(74) *Attorney, Agent, or Firm* — PROCOPIO, CORY, HARGREAVES & SAVITCH LLP

(57) ABSTRACT

The own vehicle position estimation unit 17 of the in-vehicle device 1 acquires the point cloud data which is the measurement result of the landmark by the rider 2, and acquires the feature information associated with the landmark in the map DB10. Then, the own vehicle position estimation unit 17 calculates, on the basis of the difference between the size of the landmark specified based on the acquired point cloud data and the size of the landmark indicated by the feature information, calculates the reliability information indicative of the measurement accuracy of the landmark by the lidar 2.

7 Claims, 13 Drawing Sheets

(56) References Cited

U.S. PATENT DOCUMENTS

| | | | |
|---|---|---|---|
| 2014/0046587 A1* | 2/2014 | Rintanen | B66C 19/007 |
| | | | 701/469 |
| 2016/0125608 A1* | 5/2016 | Sorstedt | G01C 21/3848 |
| | | | 348/148 |
| 2018/0050800 A1 | 2/2018 | Boykin et al. | |
| 2018/0059680 A1* | 3/2018 | Tateishi | G01S 17/931 |
| 2021/0081682 A1* | 3/2021 | Kumano | G01S 19/42 |
| 2021/0179138 A1* | 6/2021 | Terazawa | G01C 21/3476 |
| 2021/0278217 A1 | 9/2021 | Kato | |
| 2021/0394782 A1* | 12/2021 | Tagawa | G01C 21/3811 |

FOREIGN PATENT DOCUMENTS

| | | | |
|---|---|---|---|
| EP | 3018448 A1 | | 5/2016 |
| JP | 2009-020014 A | | 1/2009 |
| JP | 2013257742 A | | 12/2013 |
| JP | 2017072422 A | | 4/2017 |
| JP | 2018021777 A | * | 2/2018 |
| JP | 2018036067 A | | 3/2018 |
| JP | 2018059744 A | | 4/2018 |
| JP | 2018116014 A | | 7/2018 |
| JP | 2020-553079 A | | 10/2019 |

OTHER PUBLICATIONS

International Search Report for JP App. No. PCT/JP2019/039479 dated Nov. 5, 2019. English translation provided; 2 pages.

\* cited by examiner

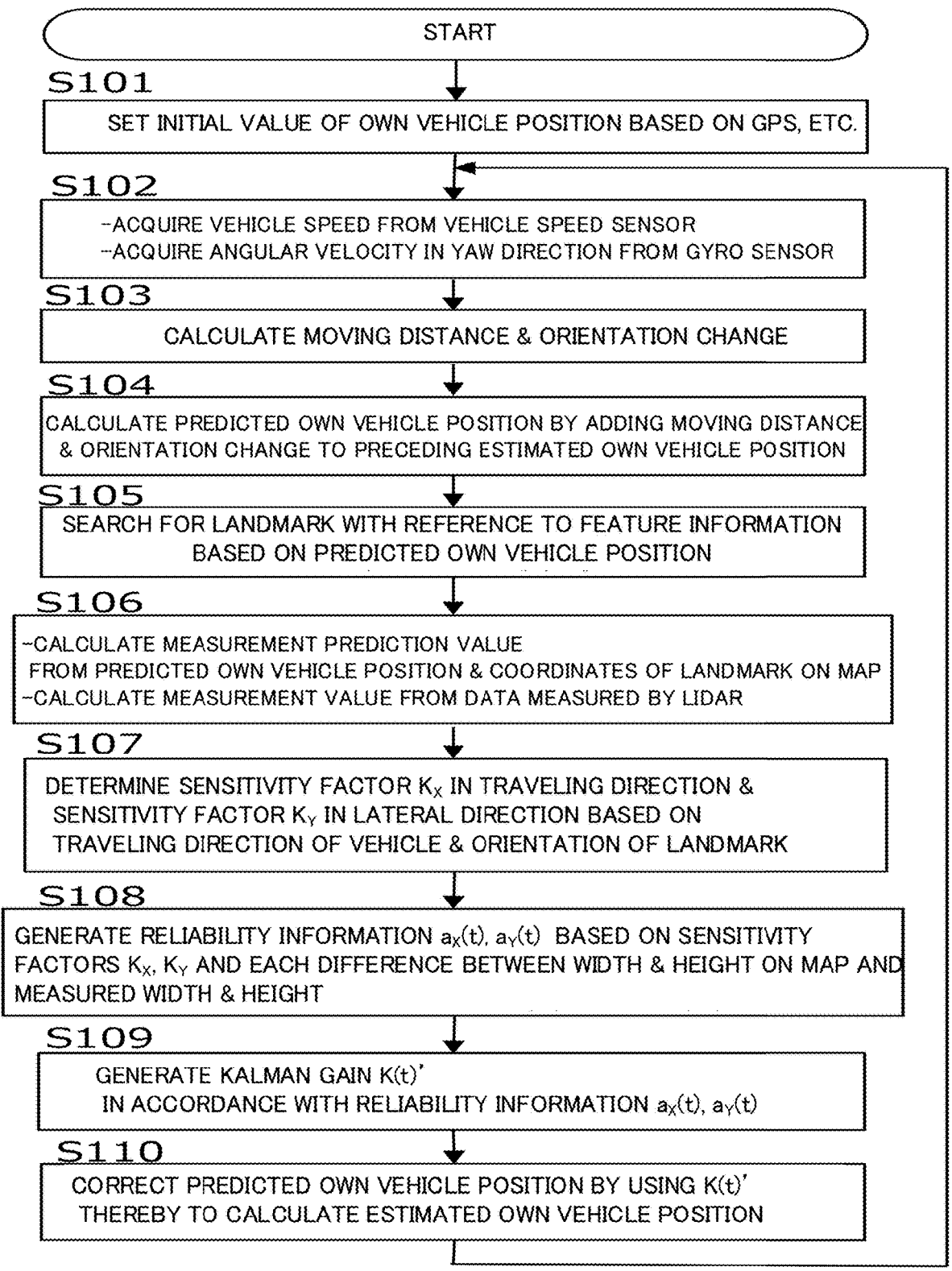

MEASUREMENT ACCURACY CALCULATION DEVICE, SELF-POSITION ESTIMATION DEVICE, CONTROL METHOD, PROGRAM AND STORAGE MEDIUM

CROSS-REFERENCE TO RELATED APPLICATIONS

This application is a U.S. National Stage entry of PCT Application No. PCT/JP2019/039479, filed on Oct. 7, 2019, which claims priority to JP Application No. 2018-200067 filed Oct. 24, 2018. The contents of the foregoing are incorporated by reference.

TECHNICAL FIELD

The present invention relates to a technique for calculating the accuracy of measurement by a measuring unit.

BACKGROUND

Conventionally, a technique is known to detect feature(s) situated in a traveling direction of a vehicle by use of a radar or a camera and to thereby calibrate the position of the vehicle based on the detection result. For example, Patent Reference 1 discloses a technique for estimating the self-position by collating the output of the measurement sensor with the position information of the feature registered in advance on the map. Further, Patent Reference 2 discloses a self-vehicle position estimation technique using a Kalman filter.

PRIOR ART REFERENCES

Patent References

Patent Reference 1: Japanese Patent Laid-Open No. 2013-257742
Patent Reference 2: Japanese Patent Laid-Open No. 2017-72422

SUMMARY OF THE INVENTION

Problem to be Solved by the Invention

When a feature to be measured is adjacent to another feature in the self-position estimation process, the other feature together with the feature to be measured is included in the measurement data, which may reduce the accuracy of the measurement result. Further, in the case where occlusion occurs in a portion of the feature to be measured, the accuracy of the measurement result may also be reduced since the portion of the feature to be measured cannot be measured.

The present invention has been made to solve the above issues, and a main object thereof is to provide a measurement accuracy calculation apparatus and a self-position estimation device capable of suitably calculating the measurement accuracy of the feature by a measuring unit.

Means for Solving the Problem

One invention is a measurement accuracy calculation device including:
a first acquisition unit configured to acquire a measurement result of a feature by a measurement unit;
a second acquisition unit configured to acquire feature information associated with the feature included in map data; and
a calculation unit configured to calculate, on a basis of a difference between a measured size of the feature and a size of the feature indicated by the feature information, accuracy information indicative of measurement accuracy of the feature by the measurement unit.

Another invention is a self-position estimation device including:
a first acquisition unit configured to acquire a measurement result of a feature by a measurement unit;
a second acquisition unit configured to acquire feature information associated with the feature included in map data;
a third acquisition unit configured to acquire the predicted position information indicative of a predicted self-position; and
a correction unit configured to correct the predicted self-position based on a difference between a measured size of the feature and a size of the feature indicated by the feature information.

Still another invention is a control method to be executed by a measurement accuracy calculation device, the control method including:
a first acquisition process to acquire a measurement result of a feature by a measurement unit;
a second acquisition process to acquire feature information associated with the feature included in map data; and
a calculation process to calculate, on a basis of a difference between a measured size of the feature and a size of the feature indicated by the feature information, accuracy information indicative of measurement accuracy of the feature by the measurement unit.

Still another invention is a program to be executed by a computer, the program causing the computer to function as:
a first acquisition unit configured to acquire a measurement result of a feature by a measurement unit;
a second acquisition unit configured to acquire feature information associated with the feature included in map data; and
a calculation unit configured to calculate, on a basis of a difference between a measured size of the feature and a size of the feature indicated by the feature information, accuracy information indicative of measurement accuracy of the feature by the measurement unit.

BRIEF DESCRIPTION OF THE DRAWINGS

FIG. 13 is a flowchart showing a vehicle position estimation process.

DETAILED DESCRIPTION OF THE PREFERRED EMBODIMENTS

Figure 1:
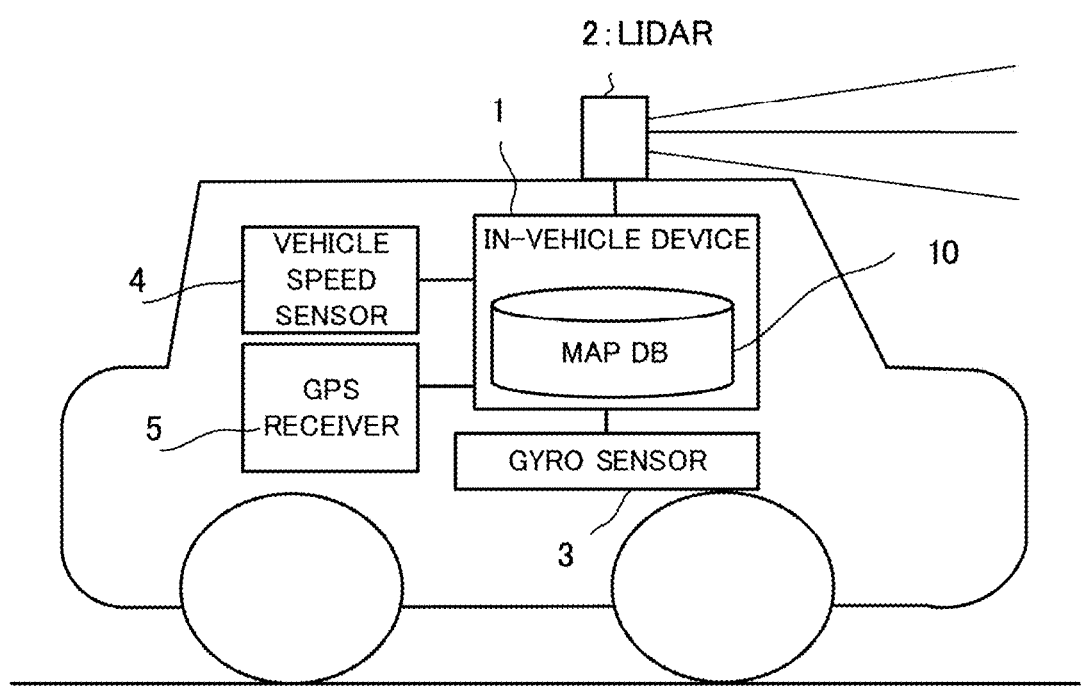
FIG. 1 is a schematic configuration diagram of a driving support system.

According to a preferred embodiment of the present invention, there is provided a measurement accuracy calculation device including: a first acquisition unit configured to acquire a measurement result of a feature by a measurement unit; a second acquisition unit configured to acquire feature information associated with the feature included in map data; and a calculation unit configured to calculate, on a basis of a difference between a measured size of the feature and a size of the feature indicated by the feature in formation, accuracy information indicative of measurement accuracy of the feature by the measurement unit. According to this aspect, the measurement accuracy calculation device can accurately calculate the accuracy information indicative of the measurement accuracy of the feature by the measurement unit in either the case where the occlusion occurs in the target feature of the measurement and some of the measurement data cannot be obtained, or the case where the measurement data of another feature adjacent to the target feature of measurement is acquired as a part of the measurement data of the target feature.

In one aspect of the measurement accuracy calculation device, the calculation unit generates the accuracy information whose measurement accuracy decreases with increase in the difference. In this way, it is possible to suitably generate accuracy information indicating that the measurement accuracy is low in either the case where the occlusion occurs in the target feature of measurement and thus a part of measurement data cannot be obtained, or the case where the measurement data of the adjacent feature is obtained as a part of the measurement data of the target feature.

In another aspect of the measurement accuracy calculation device, the calculation unit generates the accuracy information indicative of the measurement accuracy of the feature for each of a traveling direction and a lateral direction of a moving object on a basis of the difference, the traveling direction of the moving object, and a normal direction of the feature indicated by the feature information. In general, depending on the direction of the feature with respect to the traveling direction of the moving object, there are cases where the measurement error is less likely to occur and cases where the measurement error is likely to occur. Therefore, according to this aspect, the measurement accuracy calculation device can suitably generate accuracy information indicating the measurement accuracy of the feature for each of the traveling direction and the lateral direction of the moving object.

In still another aspect of the measurement accuracy calculation device, the calculation unit decreases, with increase in an angle difference between the traveling direction and the normal direction of the feature, a degree of influence of the difference on the measurement accuracy with respect to the lateral direction and the calculation unit decreases, with increase in the angle difference, the degree of influence of the difference on the measurement accuracy with respect to the traveling direction. The normal direction of the feature herein refers to the direction within 90 degrees difference from the traveling direction of the moving object selected from the front and rear directions of the feature which is perpendicular to the plane formed by the feature. In this case, the larger the angle difference between the traveling direction of the moving object and the normal direction of the feature, the more the feature is oriented sideways with respect to the moving object. Thus, in this case, the measurement error with respect to the lateral direction of the moving object is less likely to occur. On the other hand, the smaller the angular difference between the traveling direction of the moving object and the normal direction of the feature, the more the feature is oriented in front with respect to the moving object. Thus, in this case, the measurement error is less likely to occur with respect to the traveling direction of the moving object. Therefore, the measurement accuracy calculation device according to this aspect can generate the accuracy information representing precisely the measurement accuracy of the feature for each of the traveling direction and the lateral direction of the moving object.

In still another aspect of the measurement accuracy calculation device, the measurement accuracy calculation device further includes: a third acquisition unit configured to acquire the predicted position information indicative of a predicted self-position; and a correction unit configured to correct the predicted self-position based on the accuracy information. According to this aspect, the measurement accuracy calculation device can suitably execute the self-position estimation reflecting the generated accuracy information.

In still another aspect of the measurement accuracy calculation device, the correction unit determines, on a basis of the accuracy information, a gain for a difference value between: a measurement distance by the measurement unit from a moving object to the feature and a predicted distance from the moving object to the feature; and a predicted distance, predicted based on position information of the feature included in the feature information, from the moving body to the feature based on the position information of the feature included in the feature information, the predicted self-position being corrected by the difference value. According to this aspect, by adjusting the gain based on the accuracy information when correcting the predicted self-position by the difference value between the measurement distance and the predicted distance, the measurement accuracy calculation device can suitably improve the self-position estimation accuracy by preventing inaccurate correction.

According to another preferred embodiment of the present invention, the self-position estimation device including: a first acquisition unit configured to acquire a measurement result of a feature by a measurement unit; a second acquisition unit configured to acquire feature information associated with the feature included in map data; a third acquisition unit configured to acquire the predicted position information indicative of a predicted self-position; and a correction unit configured to correct the predicted self-position based on a difference between a measured size of the feature and a size of the feature indicated by the feature information. The above-described difference occurs in either the case where the occlusion occurs in the target feature of the measurement and some of the measurement data cannot be obtained or the case where the measurement data of another feature adjacent to the target feature of measurement is acquired as a part of the measurement data of the target feature. Therefore, the self-position estimation device, in accordance with this aspect, can determine the final self-position by suitably correcting the predicted self-position in consideration of the above-described difference.

According to still another preferred embodiment of the present invention, there is provided a control method to be executed by a measurement accuracy calculation device, the control method including: a first acquisition process to acquire a measurement result of a feature by a measurement unit; a second acquisition process to acquire feature information associated with the feature included in map data; and a calculation process to calculate, on a basis of a difference between a measured size of the feature and a size of the feature indicated by the feature information, accuracy information indicative of measurement accuracy of the feature by the measurement unit. By executing the above control method, the measurement accuracy calculation device can accurately calculate the accuracy information indicative of the measurement accuracy of the feature by the measurement unit in either the case where the occlusion occurs in the target feature of the measurement and some of the measurement data cannot be obtained, or the case where the measurement data of another feature adjacent to the target feature of measurement is acquired as a part of the measurement data of the target feature.

According to still another preferred embodiment of the present invention, there is provided a program to be executed by a computer, the program causing the computer to function as: a first acquisition unit configured to acquire a measurement result of a feature by a measurement unit; a second acquisition unit configured to acquire feature information associated with the feature included in map data; and a calculation unit configured to calculate, on a basis of a difference between a measured size of the feature and a size of the feature indicated by the feature information, accuracy information indicative of measurement accuracy of the feature by the measurement unit. By executing the above program, the computer can accurately calculate the accuracy information indicative of the measurement accuracy of the feature by the measurement unit in either the case where the occlusion occurs in the target feature of the measurement and some of the measurement data cannot be obtained, or the case where the measurement data of another feature adjacent to the target feature of measurement is acquired as a part of the measurement data of the target feature. In some embodiments, the program is stored on a storage medium.

Embodiments

A preferred embodiment of the present invention is described below with reference to drawings. Hereinafter, for the sake of convenience of explanation, a character with "^" or "-" on the top is expressed in the specification as "A^" or "A-" ("A" stands for a character).

Overview of Driving Support System

FIG. 1 is a schematic configuration of a driving support system according to the present embodiment. The driving support system shown in FIG. 1 includes: an in-vehicle device 1 which is mounted on a vehicle and which performs control relating to driving assistance of the vehicle; a lidar (Light Detection and Ranging, or Laser Illuminated Detection And Ranging) 2; a gyro sensor 3; a vehicle speed sensor 4; and a GPS receiver 5. Hereafter, the term "map" herein includes data used for ADAS (Advanced Driver Assistance System) and automated driving in addition to data referred to by the conventional vehicle-mounted device for route guidance.

The in-vehicle device 1 is electrically connected to the lidar 2, the gyro sensor 3, the vehicle speed sensor 4, and the GPS receiver 5 and estimates the position (also referred to as "own vehicle position") of the vehicle on which the in-vehicle device 1 is mounted based on these outputs. Then, the in-vehicle device 1 performs automatic driving control of the vehicle and the like, so as for the vehicle to travel along a route to the set destination based on the estimation result of the own vehicle position. The in-vehicle device 1 stores a map data base (DB) 10 which stores road data and feature information that is information relating to features that serve as landmarks provided in the vicinity of roads. Examples of the features that serve as landmarks described above are kilo-posts, 100 m-posts, delineators, traffic infrastructure equipment (e.g., signs, direction signs, traffic signals), utility poles, street lights, and any other features that are periodically lined up along a road. Then, the in-vehicle device 1 performs estimation of the own vehicle position by cross-checking (collating) the feature information with the output of the lidar 2 or the like. The in-vehicle device 1 is an example of a "measurement accuracy calculation device" and a "self-position estimation device" according to the present invention. Instead of being stored in the in-vehicle device 1, the map DB10 may be stored in an external storage device such as external server(s). In that case, the in-vehicle device 1 acquires at least a portion of the map DB 10 from an external storage device via a wireless communication or the like.

The lidar 2 discretely measures the distance to an external object by emitting a pulsed laser for a predetermined angular range in the horizontal and vertical directions, and generates a three-dimensional point cloud information indicative of the position of the external object. In this case, the lidar 2 includes an irradiation unit for emitting (radiating) a laser beam while changing the irradiation direction, a light receiving unit for receiving the reflected light (scattered light) that is the laser beam reflected at the object, and an output unit for outputting scan data based on the light receiving signal outputted by the light receiving unit. The scan data is a point cloud data and is generated based on irradiation direction corresponding to the laser beam received by the light receiving unit and the distance to the object in the irradiation direction, wherein the distance is specified based on the light receiving signal described above. The lidar 2, the gyro sensor 3, the vehicle speed sensor 4, the GPS receiver 5, respectively, supplies the output data to the in-vehicle device 1. The lidar 2 is an example of a "measuring unit".

Figure 2:
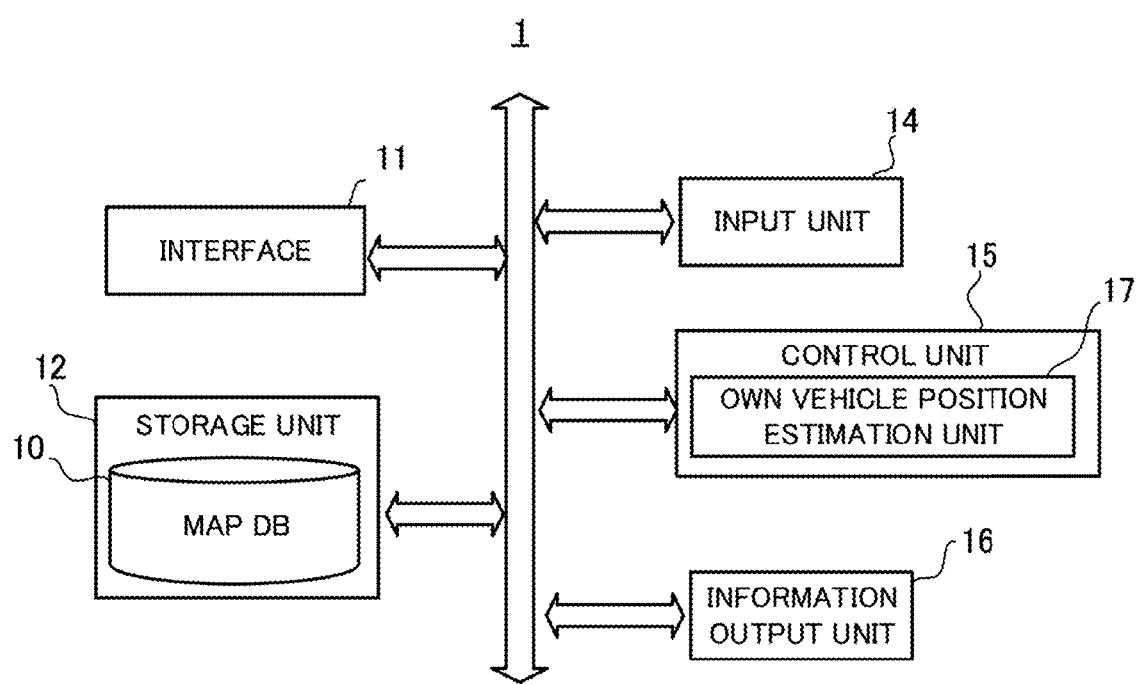
FIG. 2 is a block diagram showing a functional configuration of an in-vehicle device.

FIG. 2 is a block diagram showing a functional configuration of the vehicle-mounted device 1. The in-vehicle device 1 mainly includes an interface 11, a storage unit (memory) 12, an input unit 14, a control unit 15, and an information output unit 16. Each of these elements is connected to each other via a bus line.

The interface 11 acquires output data from sensors such as the lidar 2, the gyro sensor 3, the vehicle speed sensor 4, and the GPS receiver 5, and supplies the output data to the control unit 15.

Figure 3:
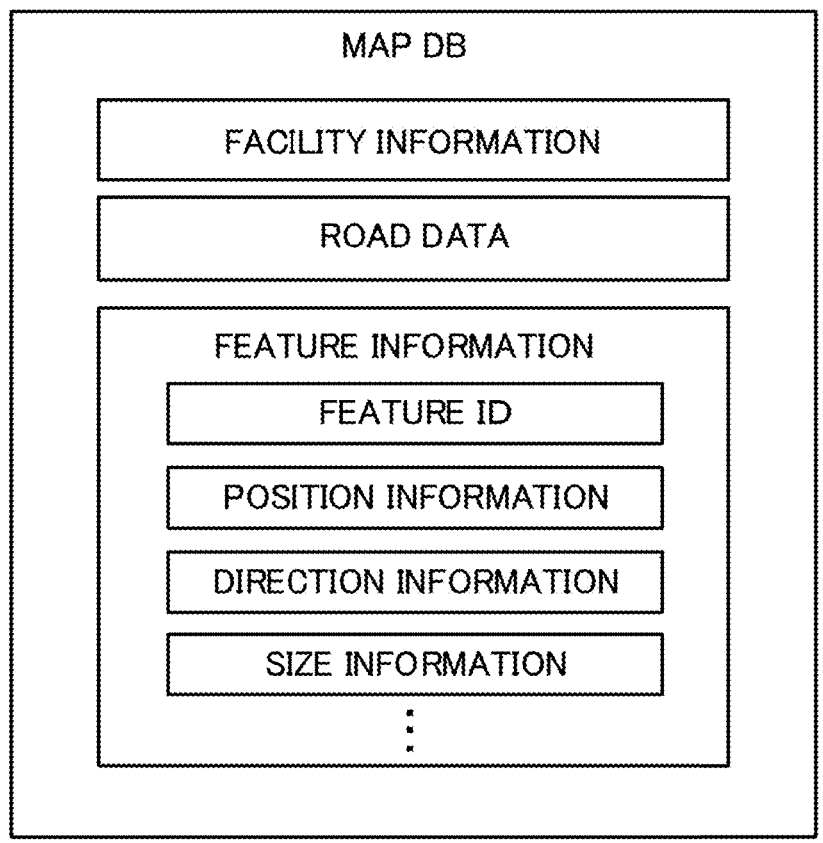
FIG. 3 illustrates an example of the data structure of a map database.

The storage unit 12 stores a program to be executed by the control unit 15, and information necessary for the control unit 15 to execute a predetermined process. In the present embodiment, the storage unit 12 stores the map DE 10 including feature information. FIG. 3 illustrates an example of the structure of a map DB 10. As shown in FIG. 3, the map DB 10 includes facility information, road data, and feature information.

The feature information is information relating to each feature and includes herein the feature ID corresponding to the index of the feature, position information, direction (orientation) information (normal information), and size information. The position information indicates the absolute position of a feature represented by latitude and longitude (and altitude). The direction information and the size information are, for example, information provided for a feature having a planar shape such as a sign. The direction information is information representing the orientation of the feature such as a normal vector of the surface formed on the feature. The size information is information representing the size of the feature. In this example, the size information includes information regarding the horizontal width and vertical width of the target surface of measurement formed in the feature.

It is noted that the map DB10 may be updated periodically. In this case, for example, the control unit 15 receives, from a server device which manages the map information, partial map information relating to the area to which the own vehicle position belongs via the communication unit (not shown). Then, the control unit 15 reflects it in the map DB10.

The input unit 14 is a button, a touch panel, a remote controller, a voice input device, or the like for the user to operate. The information output unit 16 is, for example, a display or a speaker or the like for outputting under the control of the control unit 15.

The control unit 15 includes a CPU or the like for executing a program, and controls the entire in-vehicle device 1. In the present embodiment, the control unit 15 includes an own vehicle position estimation unit 17 that estimates the vehicle position based on the output signals of the sensors and the map DB 10 supplied from the interface 11. Then, the control unit 15 performs control related to the driving assistance of the vehicle including the automatic driving control based on the estimation result of the own vehicle position. The control unit 15 is an example of "the first acquisition unit", "the second acquisition unit", "the third acquisition unit", "the calculation unit", "the correction unit" and "the computer" which executes a program in the present invention.

Outline of Own Vehicle Position Estimation Process

First, an outline of the estimation process of the own vehicle position by the own vehicle position estimation unit 17 will be described.

The vehicle position estimation unit 17 corrects the position of the vehicle estimated from the output data of the gyro sensor 3, the vehicle speed sensor 4, and/or the GPS receiver 5 based on the measurement values of the distance and the angle by the lidar 2 with respect to feature(s) (also referred to as the "landmark (s)") to be measured and the position information of the landmark extracted from the map DB 10. In this embodiment, as an example, the own vehicle position estimation unit 17 alternately executes a prediction step of predicting the vehicle position from the output data of the gyro sensor 3, the vehicle speed sensor 4, and the like based on the state estimation method based on the Bayesian estimation, and a measurement update step of correcting the predicted value of the vehicle position calculated in the previous prediction step. Various filters developed to perform Bayesian estimation such as an extended Kalman filter, an answered Kalman filter and a particle filter are available for the state estimation filter used in these steps. As described above, various methods have been proposed for position estimation based on Bayesian estimation.

In the following, the own vehicle position estimation using the extended Kalman filter will be briefly described.

Figure 4:
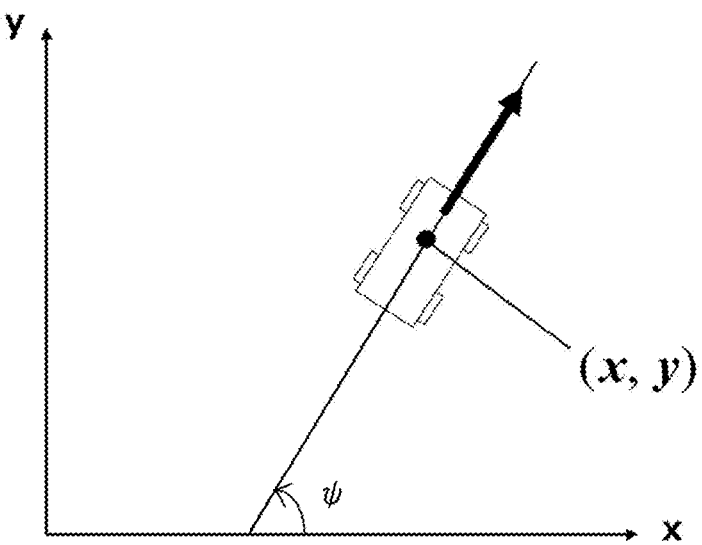
FIG. 4 illustrates a diagram showing a state variable vector in two-dimensional orthogonal coordinates.

FIG. 4 is a diagram showing a state variable vector in two-dimensional orthogonal coordinates. As shown in FIG. 4, the position of the vehicle in a plane defined on the two-dimensional orthogonal coordinates of xy is represented by the coordinates "(x, y)" and the azimuth (yaw angle) "$\psi$" of the own vehicle. Here, the yaw angle $\psi$ is defined as the angle formed by the traveling direction of the vehicle and the x-axis. The coordinates (x, y) indicate, for example, an absolute position corresponding to the combination of latitude and longitude, or a world coordinate indicating a position where the origin is a predetermined point.

Figure 5:
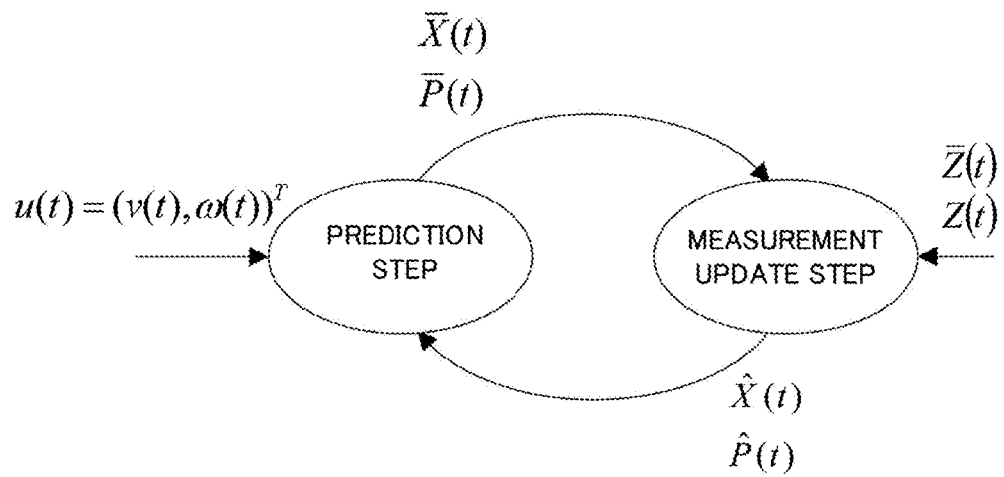
FIG. 5 is a diagram showing a schematic relationship between the prediction step and the measurement update step.
Figure 6:
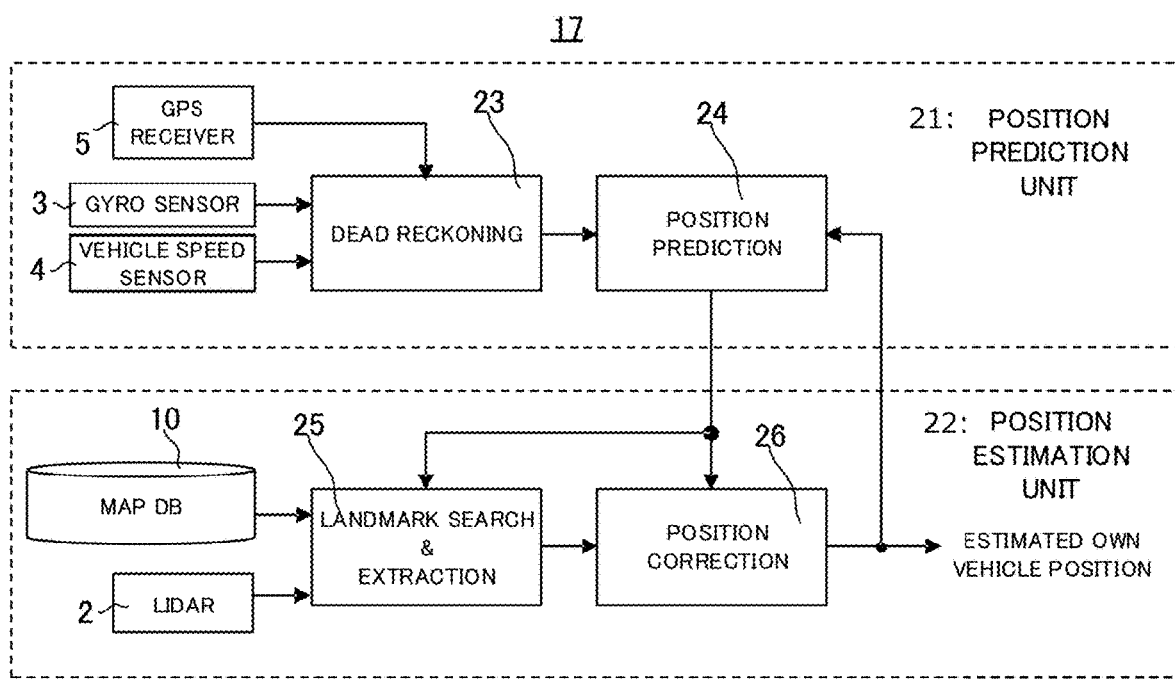
FIG. 6 illustrates the function block of the position estimation unit of the vehicle.

FIG. 5 is a diagram showing a schematic relationship between the prediction step and the measurement update step. Further, FIG. 6 shows an example of a functional block of the own vehicle position estimation unit 17. As shown in FIG. 5, by repeating the prediction step and the measurement update step, the calculation and update of the estimated value of the state variable vector "X" indicating the own vehicle position are sequentially executed. Further, as shown in FIG. 6, the own vehicle position estimation unit 17 includes a position prediction unit 21 for executing the prediction step, and a position estimation unit 22 for executing the measurement update step. The position prediction unit 21 includes a dead reckoning block 23 and a position prediction block 24, and the position estimation unit 22 includes a landmark search and extraction block 25 and a position correction block 26. In FIG. 5, the state variable vector at the reference time "t" (i.e., the current time) sub-jected to calculation is denoted as "X$^-$(t)" or "X$^-$(t)" (denoted as "state variable vector X(t)=(x(t), y(t), $\lambda$(t))$^T$"). Here, the provisional estimation value (predicted value) calculated at the prediction step is denoted by "$^-$" on the character representing the provisional estimation value, and the estimation value updated at the measurement update step to have a higher precision is denoted by "$^\wedge$" on the character representing the estimation value.

At the prediction step, by using the moving speed "v" and the angular velocity "$\omega$" (collectively referred to as "control value u(t)=(v(t), $\omega$(t))$^T$)) of the vehicle, the dead reckoning block 23 of the own vehicle position estimation unit 17 calculates the moving distance and the azimuth change from the previous (preceding) time. The position prediction block 24 of the own vehicle position estimation unit 17 calculates the predicted value (also referred to as "predicted own vehicle position") X$^-$(t) of the vehicle position at the time t by adding the calculated travel distance and the azimuth change to the state variable vector X$^-$(t−1) at the time t−1 calculated at the preceding measurement update step. At the same time, the covariance matrix "P$^-$(t)" corresponding to the error distribution of the predicted own vehicle position X$^-$(t) is calculated from the covariance matrix "P$^-$(t−1)" at time t−1 calculated at the preceding measurement update step.

At the measurement update step, the landmark search and extraction block 25 of the own vehicle position estimation unit 17 associates the position vector of the feature (landmark) of the measurement target registered in the map DB 10 with the scan data of the rider 2. Then, when the above association is successfully completed, the landmark search and extraction block 25 of the own vehicle position estimation unit 17 acquires the measurement value "Z(t)" of the associated landmark measured by the lidar 2 and the measurement value (referred to as the "measurement prediction value") "Z⁻(t)" of the landmark, wherein Z⁻(t) is calculated by modeling the measurement process by the lidar 2 using the predicted own vehicle position X⁻(t) and the position vector of the landmark that is registered in the map DB 10. The measurement value Z(t) is a vector value in the vehicle coordinate system with aXes corresponding to the traveling direction and the lateral direction of the vehicle which is converted from the distance and the scan angle of the landmark measured by the lidar 2 at time t. Then, the position correcting block 26 of the own vehicle position estimation unit 17 calculates a difference value between the measurement value Z(t) and the measurement prediction value Z⁻(t).

In practice, the landmark has a predetermined size, data corresponding to a plurality of measurement points on the surface irradiated with the laser beams of the lidar 2 is acquired as point cloud data. Therefore, for example, the landmark search and extraction block 25 calculates the measurement value Z(t) corresponding to the center position of the target landmark by averaging the measurement values at each measurement point of the target landmark of measurement.

Then, as shown in the following equation (1), the position correction block 26 of the own vehicle position estimation unit 17 multiplies the Kalman gain "K(t)" to the difference value between the measurement value Z(t) and the measurement prediction value Z⁻(t) and adds this to the predicted own vehicle position X⁻(t) to calculate the updated state variable vector (also referred to as "estimated own vehicle position") X⁻(t).

$$\hat{X}(t) = \bar{X}(t) + K(t)\{Z(t) - \bar{Z}(t)\} = \begin{bmatrix} \hat{x}(t) \\ \hat{y}(t) \\ \hat{\psi}(t) \end{bmatrix} = \begin{bmatrix} \bar{x}(t) \\ \bar{y}(t) \\ \bar{\psi}(t) \end{bmatrix} + \begin{bmatrix} k_{11}(t) & k_{12}(t) \\ k_{21}(t) & k_{22}(t) \\ k_{31}(t) & k_{32}(t) \end{bmatrix} \begin{bmatrix} L_x(t) - \bar{L}_x(t) \\ L_y(t) - \bar{L}_y(t) \end{bmatrix} \quad (1)$$

At the measurement update step, similarly to the prediction step, the position correction block 26 of the own vehicle position estimation unit 17 obtains the covariance matrix P⁻(t) (simply referred to as P(t)) corresponding to the error distribution of the estimated own vehicle position X⁻(t)) from the covariance matrix P⁻(t). Parameters such as Kalman gain K(t) can be calculated according to known self-position estimation technique using an extended Kalman filter, for example.

In this embodiment, the own vehicle position estimation unit 17 corrects the Kalman gain K(t) in accordance with the reliability information described later that is an index representing the reliability of the measurement value Z(t) (i.e., the measurement distance to the center point of the landmark). Thereby, the own vehicle position estimation unit 17 lowers the Kalman gain K(t) to reduce the correction amount of the predicted own vehicle position X⁻(t) in such a case where the reliability of the measurement value Z(t) is low due to the presence of feature(s) adjacent to the landmark or the occurrence of occlusion. In this situation, inaccurate corrections to the predicted own vehicle position X⁻(t) are suitably suppressed and the self-position estimation accuracy is improved.

It is noted that, when the position vectors of multiple features registered in the map DB 10 are associated with the scan data by the rider 2, the own vehicle position estimation unit 17 may perform the measurement update step based on a set of the measurement prediction value and the measurement value corresponding to any feature selected from the multiple features, or may repeatedly perform the measurement update step based on all sets of the measurement prediction value and the measurement value corresponding to the multiple features. Taking into consideration that the lidar measurement accuracy deteriorates as the feature farther from the lidar 2, in such a case where a plurality of sets of the measurement prediction value and the measurement value are used, the own vehicle position estimation unit 17 may reduce the weight on a feature with increasing distance between the lidar 2 and the feature.

As described above, the prediction step and the measurement update step are repeatedly performed, and the predicted own vehicle position X⁻(t) and the estimated own vehicle position X⁻(t) are sequentially calculated, so that the most accurate vehicle position is calculated.

In the above description, the measurement value Z(t) is an example of the measurement distance of the present invention, the measurement prediction value Z⁻(t) is an example of the predicted distance of the present invention.

Calculation of Reliability Information

Next, a description will be given of a calculation method of reliability information that is an index representing the reliability of the measurement value Z(t). Schematically, the own vehicle position estimation unit 17 calculates the difference between the size, on the map, of the landmark indicated by the size information included in the feature information and the size of the measurement range (range in which the measurement points of the landmark measured by the lidar 2 are distributed), and calculates the reliability information by normalizing the difference. Thus, the own vehicle position estimation unit 17 calculates the reliability information accurately representing the reliability of the measurement value Z(t).

(1) Calculation of Reliability Information Regardless of Direction

First, a description will be given of a case of generating the reliability information regardless of the direction with respect to the measurement value Z(t).

In this case, as shown in the following equation (2), the own vehicle position estimation unit 17 determines the reliability information a(t) based on the width "$W_M$" and the height (width in the height direction) "$H_M$", on the map, of the landmark included in the feature information, the width "$W_L(t)$" and the height "$H_L(t)$" of the measurement range of the landmark specified based on the point cloud data generated by the rider 2 at the time t, and the sensitivity factor "k".

$$\alpha(t) = \exp\left\{-k\left(\left(\frac{W_L(t) - W_M}{W_M}\right)^2 + \left(\frac{H_L(t) - H_M}{H_M}\right)^2\right)\right\} \quad (2)$$

In the above equation (2), the reliability information a(t) is normalized to be a value range from 0 to 1, and the closer the measured horizontal width $W_L(t)$ and the vertical width $H_L(t)$ are to the horizontal width $W_M$ and the vertical width $H_M$ on the map, the closer the reliability information a(t) is to 1 that is the maximum value. Thus, the farther the horizontal width $W_L(t)$ and the vertical width $H_L(t)$ are from the horizontal width $W_M$ and the vertical width $H_M$, the closer the reliability information a(t) is to 0. It is noted that, the closer the reliability information a(t) is to 1, the higher reliability of the measurement value Z(t) the reliability information a(t) indicates (i.e., the measurement value Z(t) is accurate). Further, the sensitivity factor k is a factor for adjusting the sensitivity for the reliability information a(t) with respect to the deviation of the measured horizontal width $W_L(t)$ and the measured vertical with $H_L(t)$ to the horizontal $W_M$ and the vertical width $H_M$ on the map. The reliability information a(t) decreases with increase in the sensitivity factor k. Incidentally, the sensitivity coefficient k is set to, for example, a predetermined value.

Figure 7A:
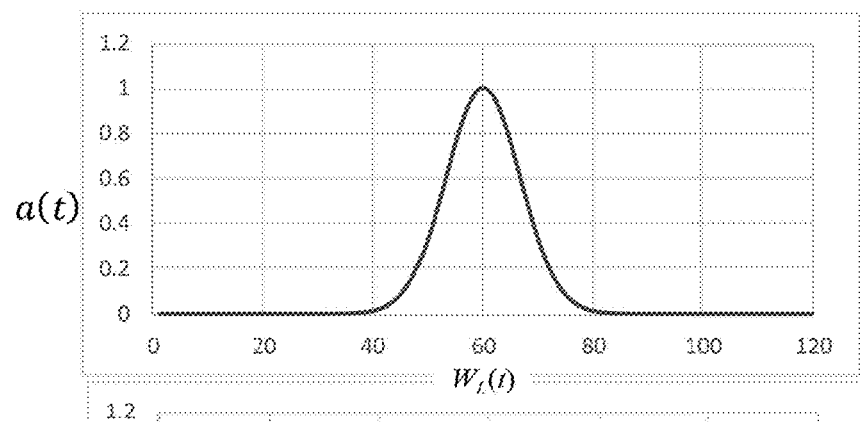
FIGS. 7A-7D illustrate graphs reliability information.
Figure 7B:
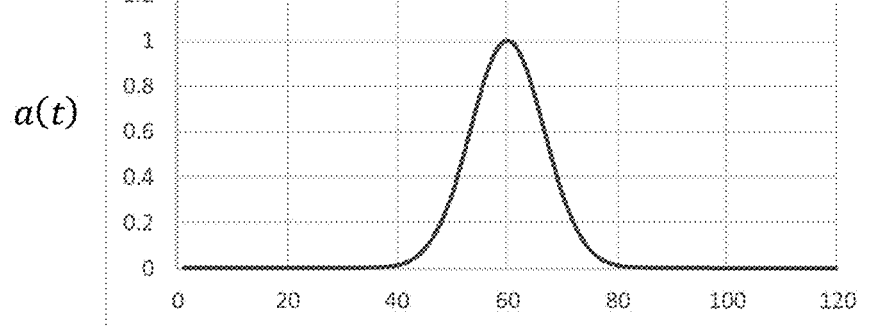
Figure 7C:
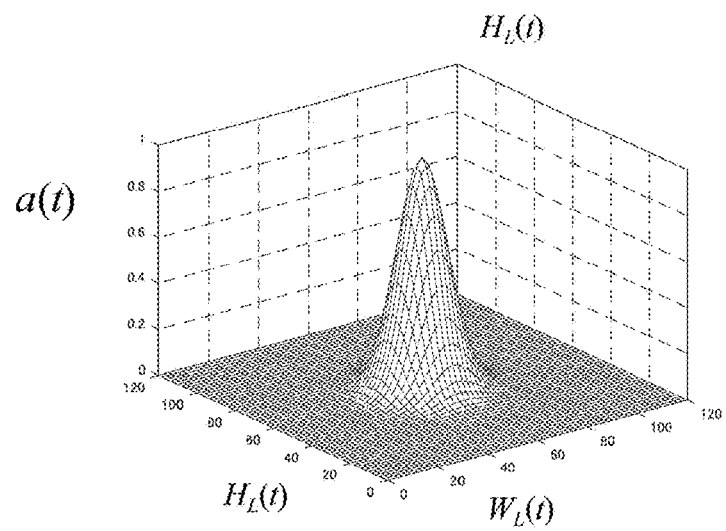
Figure 7D:
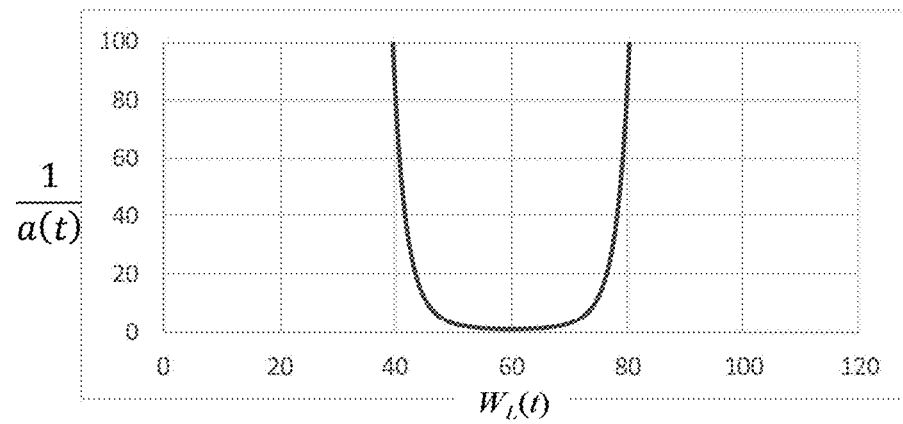

FIG. 7A is a two-dimensional graph showing the relation between the horizontal $W_L(t)$ and the reliability information a(t) based on the equation (2) when the vertical width $H_L(t)$ is fixed to 60 cm with a horizontal width $W_M$ of 60 cm and a vertical width $H_M$ of 60 cm. Further, FIG. 7B is a two-dimensional graph showing the relation between the vertical width $H_L(t)$ and the reliability information a(t) when the horizontal width $W_L(t)$ is fixed to 60 cm with respect to the same landmark as FIG. 7A. Further, FIG. 7C is a three-dimensional graph showing the relation among the horizontal width $W_L(t)$ and the vertical width $H_L(t)$ and the reliability information a(t) for the same landmark as FIGS. 7A and 7B. Further, FIG. 7D is a graph showing the inverse "1/a(t)" of the reliability information a(t) in FIG. 7A.

As shown in FIG. 7A and FIG. 7C, as the horizontal width $W_L(t)$ approaches 60 cm that is the horizontal width $W_M$, the reliability information a (t) approaches 1, which is the maximum value. On the other hand, as shown in FIG. 7B and FIG. 7C, as the vertical width $H_L(t)$ approaches 60 cm that is the vertical width $H_M$, the reliability information a(t) approaches 1, which is the maximum value. As shown in FIG. 7D, the inverse of the reliability information a(t) approaches 1 that is the smallest value as the horizontal width $W_L(t)$ approaches the horizontal width $W_M$, and it increases as the horizontal width $W_L(t)$ moves away from the horizontal width $W_M$. Similarly, the inverse of the reliability information a(t) approaches 1 which is the smallest value as the vertical width $H_L(t)$ approaches the vertical width $H_M$, and it increases as the vertical width $H_L(t)$ moves away from the vertical width $H_M$. The inverse of the reliability information a(t), as described later, is used when setting the Kalman gain in accordance with the reliability information.

Here, the validity of the equation (2) will be supplementarily described using specific examples shown in FIGS. 8 and 9.

Figure 8A:
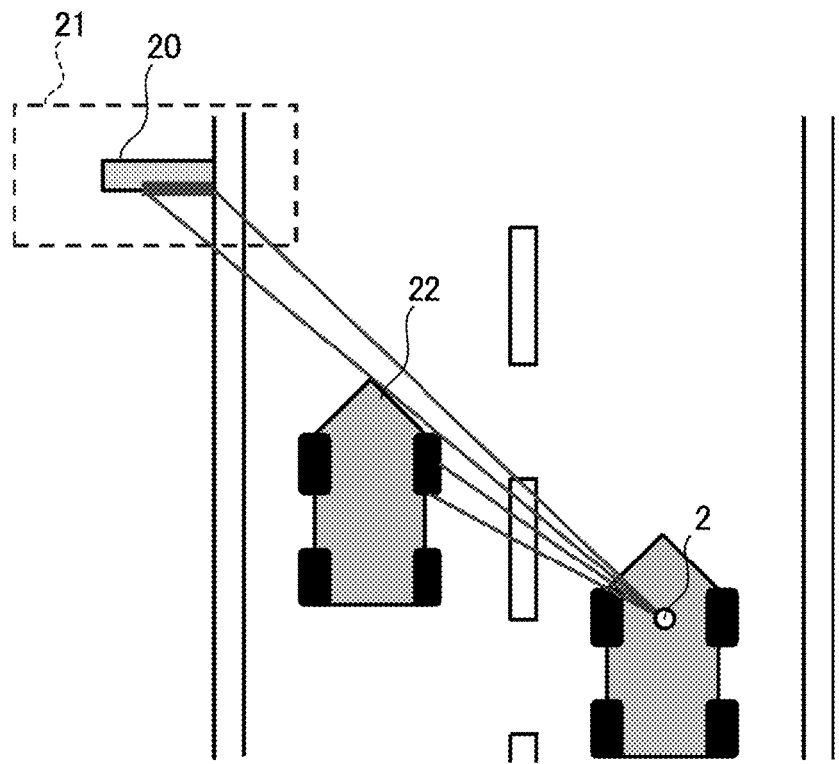
FIGS. 8A-8B schematically illustrate the irradiation range of the laser beam of the lidar when occlusion occurs.
Figure 8B:
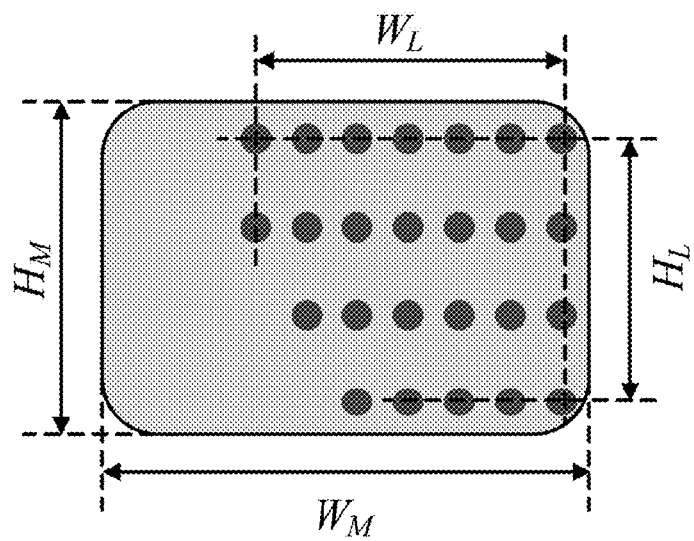

FIG. 8A is a diagram schematically showing the irradiation range of the laser beam of the lidar 2 when occlusion occurs at the time of measurement by the lidar 2 of the feature 20 serving as a landmark, FIG. 8B is a plane view of the object 20 which clearly shows the measurement points on the surface irradiated with the laser beam of the lidar 2. Here, as an example, the feature 20 is a road sign with a high degree of reflection intensity of the laser beam.

The vehicle position estimation unit 17 recognizes that there is a feature 20 serving as a landmark within the measurement range by the lidar 2, and sets a window 21 indicating a range in which the feature 20 is predicted to be present. For example, the own vehicle position estimation unit 17 specifies, as a landmark, the feature 20 whose position information in the feature information indicates a position within a predetermined distance from the predicted own vehicle position $X^-(t)$, and sets, as the window 21, a predetermined size of a rectangular area centered on a position indicated by the position information of the feature 20. In this case, the own vehicle position estimation unit 17 may determine the size of the window 21 by further referring to the size information of the feature 20. Then, the own vehicle position estimation unit 17 determines, as the point cloud data of the feature 20, the point cloud data of measurement points which indicate positions in the window 21 and which have the reflection intensity equal to or greater than a predetermined threshold value.

In this case, as shown in FIG. 8B, the horizontal width $W_L(t)$ of the feature 20 to be specified based on the point cloud data generated by the rider 2 in the window 21 is shorter than the horizontal width $W_M$ of the feature 20 on the map. Therefore, in this case, the own vehicle position estimation unit 17, based on the equation (2), sets the reliability information a(t) to a value smaller than 1 (see FIG. 7A and FIG. 7C).

Meanwhile, the own vehicle position estimation unit 17 calculates the measurement value Z(t) of the feature 20 used for the calculation (see Equation (1)) of the estimated own vehicle position $X^-(t)$ by averaging the measurement values of the respective measurement points in the window 21. Here, since the occlusion has occurred in a portion of the left side of the feature 20, the measurement value Z(t) calculated by the above-described averaging becomes a value shifted to the right than the true value to be calculated (i.e., the value indicating the center position of the feature 20).

Thus, according to Equation (2), the own vehicle position estimation unit 17 can set the reliability information a(t) to a low value in such a case that occlusion occurs in the landmark and that it is estimated that the deviation occurs in the measurement value Z(t). Thus, as will be described later, the own vehicle position estimation unit 17 reduces the correction amount for the predicted own vehicle position X(t) when the reliability of the measurement value Z(t) is low, which suitably improves the self-position estimation accuracy by preventing inaccurate correction.

Figure 9A:
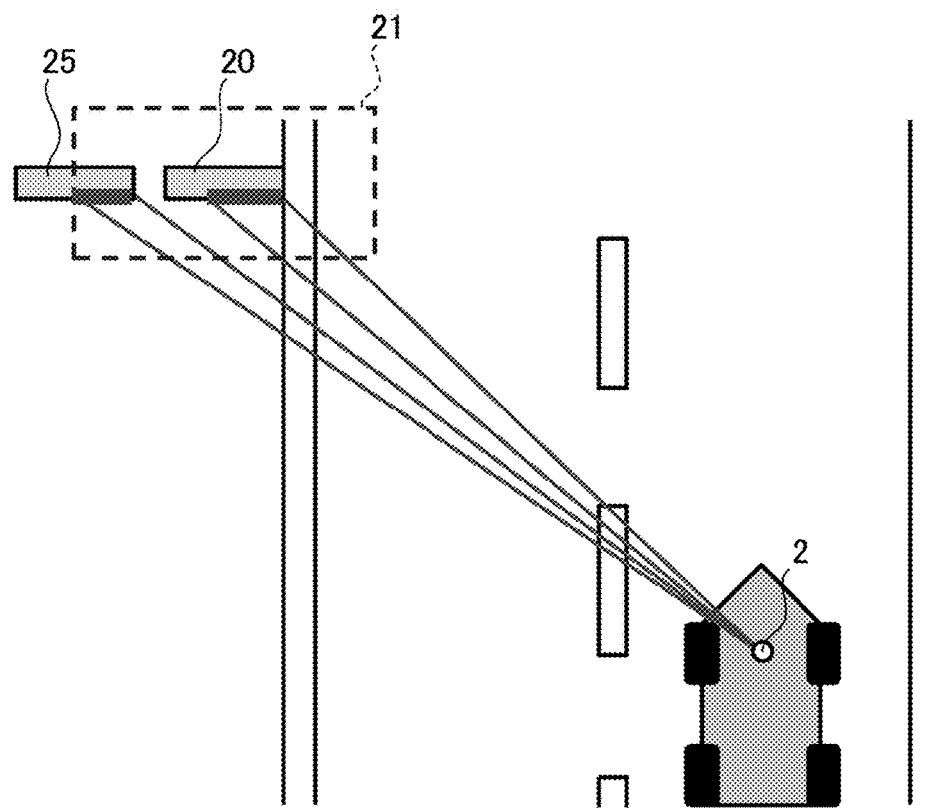
FIGS. 9A-9B are diagrams schematically showing the irradiation range of the laser beam of the lidar when another feature is adjacent to a feature serving as a landmark.
Figure 9B:
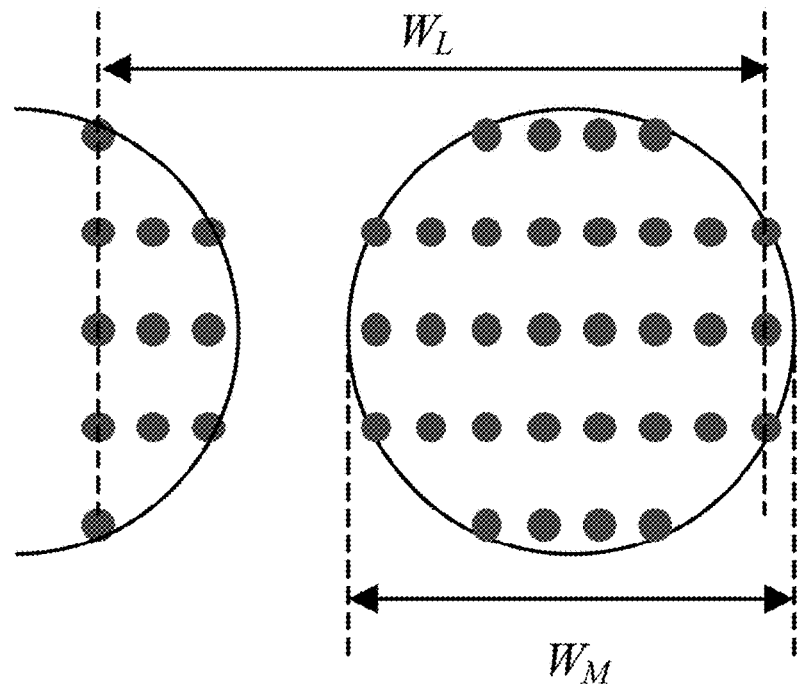

FIG. 9A is a diagram schematically showing the irradiation range of the laser beam of the lidar 2 when the other feature 25 is adjacent to the feature 20 serving as a landmark. FIG. 9B is a plane view of the object 20 which clearly shows the measurement points on the surface irradiated with the laser beam of the lidar 2 in FIG. 9A.

In the example of FIG. 9A, after setting the window 21, the own vehicle position estimation unit 17 recognizes, as the point cloud data of the feature 20, the point cloud data corresponding to the measurement points in the window 21 having a reflection intensity equal to a predetermined threshold value or more. Here, in the window 21, in addition to the measurement points of the feature 20, there are included the measurement points of a portion of the feature 25 adjacent to the feature 20.

In this case, as shown in FIG. 9B, the horizontal width $W_L(t)$ specified based on the point cloud data generated by the rider 2 in the window 21 is longer than the horizontal width $W_M$ of the feature 20 on the map. Therefore, in this case, since the difference between the horizontal width $W_L(t)$ and the horizontal width $W_M$ on the map is large, the own vehicle position estimation unit 17 sets the reliability information a(t) to a value smaller than 1 based on the equation (2) (see FIG. 7A and FIG. 7C).

Meanwhile, the own vehicle position estimation unit 17 calculates the measurement value Z(t) of the feature 20 used for the calculation (see the equation (1)) of the estimated own vehicle position X⁻(t) by averaging the measurement values of the respective measurement points in the window 21. Here, in the point cloud data in the window 21, in addition to the point cloud data of the measured feature 20, there is also included the point cloud data obtained by measuring the feature 25 adjacent to the feature 20. Accordingly, the measurement value Z(t) calculated by use of the above-described averaging is shifted to the left than the true value to be calculated (i.e., the value indicating the center position of the feature 20).

Thus, according to the equation (2), even when the deviation occurs in the measurement value Z(t) due to existence of another feature adjacent to the target feature of the measurement, the vehicle position estimator 17 can set the reliability information a(t) to a low value. Thus, as will be described later, the own vehicle position estimation unit 17 reduces the correction amount for the predicted own vehicle position X⁻(t) when the reliability of the measurement value Z(t) is low, which suitably improves the self-position estimation accuracy by preventing inaccurate correction.

It is noted that features serving as landmarks are often made of retroreflective material and therefore the intensity of the reflected light returning to the lidar 2 is high. Thus, it can be said that it is easy to extract the point cloud data thereof through a filter using a threshold for the reflection intensity. On the other hand, in the traveling environment, since there are a large number of objects having high reflection intensity such as a reflector of other vehicles and a line-of-sight guide mark, there is a possibility of erroneously detecting their point cloud data as the point cloud data of the landmark. In such cases, the horizontal width $W_L(t)$ is longer than the horizontal width $W_M$, and/or, the vertical width $H_L(t)$ is longer than the vertical width $H_M$. In such a case, in the present embodiment, the own vehicle position estimation unit 17 can appropriately set, based on the equation (2), the reliability information a(t) indicating that the reliability of the measurement value is low.

(2) Calculation of Reliability Information for Each Direction

Next, an example of calculating the reliability information for each of the traveling direction and the lateral direction of the vehicle. In this case, schematically, the own vehicle position estimation unit 17 refers to the direction information included in the feature information and calculates the reliability information with respect to the traveling direction and the lateral direction of the vehicle based on the relative orientation of the landmark with respect to the traveling direction of the vehicle. Hereafter, "$a_X(t)$" denotes the reliability information in the traveling direction of the vehicle at time t, and "$a_Y(t)$" denotes the reliability information in the horizontal direction at time t.

If the landmark is facing the same direction as the traveling direction of the vehicle, the irradiated surface of the landmark is perpendicular to the traveling direction of the vehicle. In this case, when the deviation of the measured horizontal width $W_L(t)$ and the vertical width $H_L(t)$ to the horizontal width $W_M$ and the vertical width $H_M$ on the map is large, although the center point of the measurement value Z(t) deviates, the measurement value $L_X(t)$ corresponding to the component in the travelling direction of the vehicle has no large error. Therefore, the reliability information $a_X(t)$ need not be much smaller. On the other hand, since an error occurs in the measurement value $L_Y(t)$ corresponding to the component in the horizontal direction of the vehicle, the value of the reliability information $a_Y(t)$ must be reduced.

In consideration of the above, the own vehicle position estimation unit 17 uses different sensitivity factors "$k_X$" and "$k_Y$" instead of the sensitivity factor k of the equation (2) in the case of calculating the reliability information $a_X(t)$ and the reliability information $a_Y(t)$, respectively. Specifically, the own vehicle position estimation unit 17 calculates the reliability information $a_X(t)$ according to the following equation (3) using the sensitivity factor $k_X$, and calculates $a_Y(t)$ according to the following equation (4) using the sensitivity factor $k_Y$.

$$a_X(t) = \exp\left\{-k_X\left(\left(\frac{W_L(t)-W_M}{W_M}\right)^2 + \left(\frac{H_L(t)-H_M}{H_M}\right)^2\right)\right\} \quad (3)$$

$$a_Y(t) = \exp\left\{-k_Y\left(\left(\frac{W_L(t)-W_M}{W_M}\right)^2 + \left(\frac{H_L(t)-H_M}{H_M}\right)^2\right)\right\} \quad (4)$$

The vehicle position estimation unit 17 determines these sensitivity factors $k_X$ and $k_Y$ based on the relative orientation of the landmark with respect to the traveling direction of the vehicle. Specifically, the own vehicle position estimation unit 17 reduces the sensitivity factor $k_X$ for the reliability information $a_X(t)$ and increases the sensitivity factor $k_Y$ for the reliability information $a_Y(t)$ as the direction of the landmark and the traveling direction of the vehicle approach each other to be in parallel. On the other hand, the own vehicle position estimation unit 17 increases the sensitivity factor $k_X$ for the reliability information $a_X(t)$ and reduces the sensitivity factor $k_Y$ for the reliability information $a_Y(t)$ as the angle between the direction of the landmark and the traveling direction of the vehicle approach the right angle (vertical).

Figure 10:
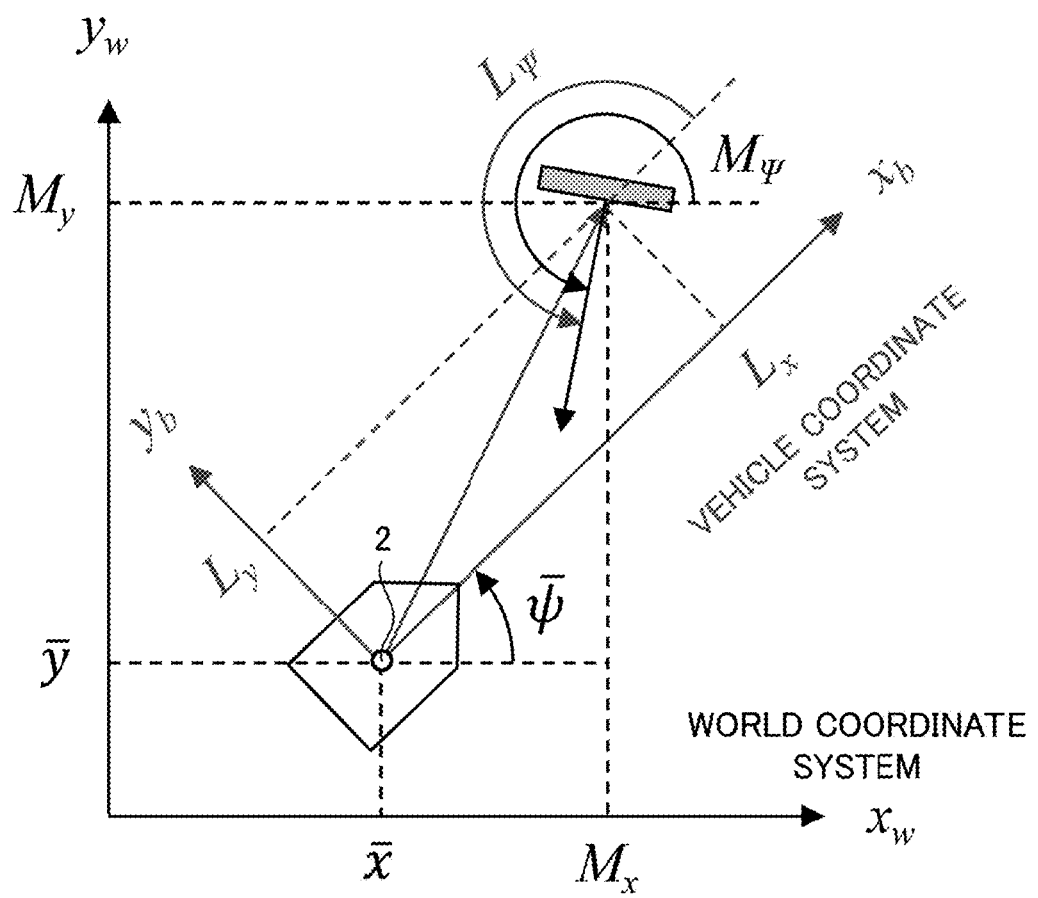
FIG. 10 is a diagram showing the positional relationship between the vehicle and the landmark represented by the two-dimensional world coordinate system and the vehicle coordinate system.

FIG. 10 is a diagram showing the positional relationship between the vehicle and the landmark represented by the two-dimensional world coordinate system (absolute coordinate system) and the vehicle coordinate system. Here, the world coordinate system has a coordinate axis "$x_w$" and a coordinate axis "$y_w$" which are perpendicular to each other wherein the origin is a predetermined point. The vehicle coordinate system has a coordinate axis "$x_b$" along the traveling direction of the vehicle and a coordinate axis "$y_b$" along the side direction of the vehicle wherein the origin is the center of the vehicle. Then, in FIG. 10, the yaw angle of the vehicle in the world coordinate system is denoted by "$\psi$⁻" and the position of the vehicle is denoted by $[x^-, y^-]^T$. In addition, the yaw angle of the landmark in the world coordinate system is denoted by "$M_\psi$", the position is denoted by $[M_x, M_y]^T$, the yaw angle of the landmark in the vehicle coordinate system is denoted by "$L_\psi$" and the position is denoted by $[L_x, L_y]^T$.

In this instance, the orientation of the landmark as viewed from the vehicle is equal to the yaw angle $L_\psi$ of the landmark in the vehicle coordinate system wherein the yaw angle $L_\psi$ is equal to "$M_\psi - \psi$⁻" as shown in FIG. 10. Therefore, the own vehicle position estimation unit 17 determines the sensitivity factors $k_X$, $k_Y$ using "$M_\psi - \psi$⁻" and the constant "c" according to the following equations (5) and (6), respectively.

$$k_X(t) = \frac{c}{\cos(M_\psi - \hat{\psi})} \quad (5)$$

$$k_Y(t) = \frac{c}{\sin(M_\psi - \hat{\psi})} \quad (6)$$

According to the above equations (5) and (6), as the landmark faces the front direction when viewed from the vehicle, the sensitivity factor $k_X$ approaches the minimum value c and the sensitivity factor $k_Y$ becomes a large value. In other words, the more horizontally the landmark is facing from the vehicle, the larger the sensitivity factor $k_X$ is and the closer the sensitivity factor $k_Y$ is to the smallest value c.

Figure 11A:
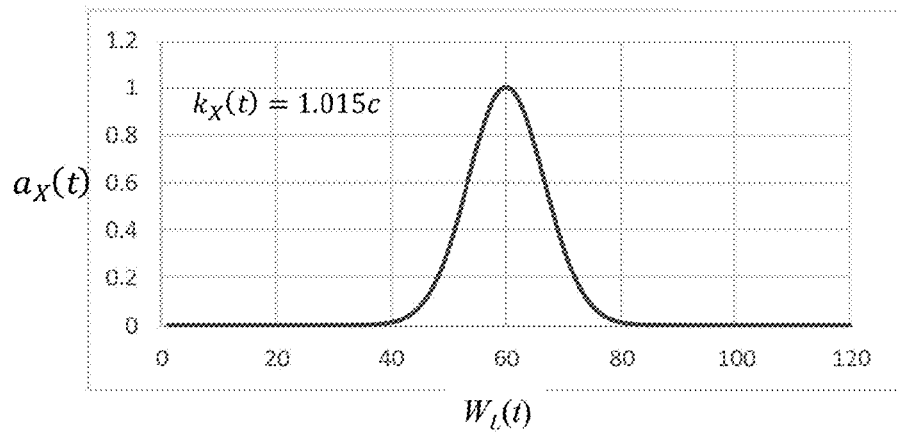
FIGS. 11A-11B are two-dimensional graphs of reliability information when the landmark faces almost in front when viewed from the vehicle.
Figure 11B:
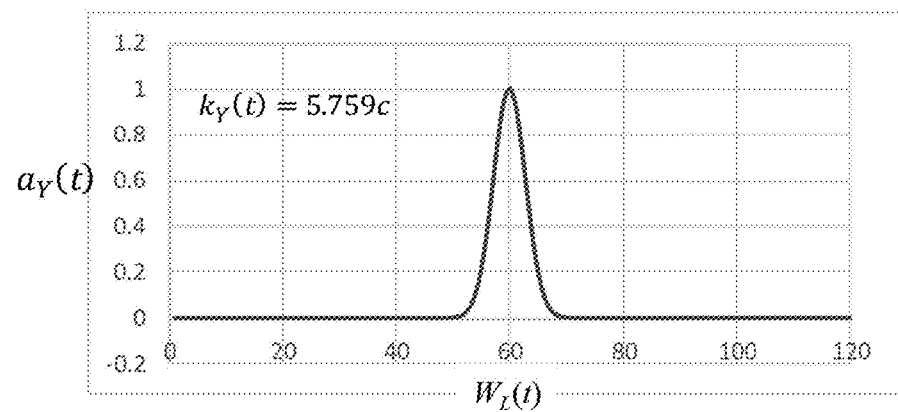

FIG. 11A is a two-dimensional graph showing the relation between the horizontal width $W_L(t)$ and the reliability information $a_X(t)$ based on the equation (3) when the vertical width $H_L(t)$ is fixed to 60 cm and the landmark has the horizontal width $W_M$ of 60 cm and the vertical width $H_M$ of 60 cm and the "$M_\psi-\psi^-$" is 10°. Further, FIG. 11B is a two-dimensional graph showing the relationship between the reliability information $a_Y(t)$ based on the equation (4) and the horizontal $W_L(t)$ under the same conditions as FIG. 11A. In each graph shown in FIG. 11 and FIG. 12 to be described later, the constant c is set to 20.

In the case of FIG. 11A, since "$M_\psi-\psi^-$" is 10°, the sensitivity coefficient $k_X$ is "1.015 c" based on the equation (5). On the other hand, in the case of FIG. 11B, the sensitivity coefficient $k_Y$ is "5.759 c" based on the equation (6). Thus, when the landmark is facing substantially the front of the vehicle, the sensitivity factor $k_X$ is close to c and the sensitivity factor $k_Y$ is much larger than the sensitivity factor $k_X$. Then, in this case, the reliability information $a_Y(t)$ is sensitive to the deviation of the measured horizontal width $W_L(t)$ and the vertical width $H_L(t)$ to the horizontal width $W_M$ and the vertical width $H_M$ on the map.

Figure 12A:
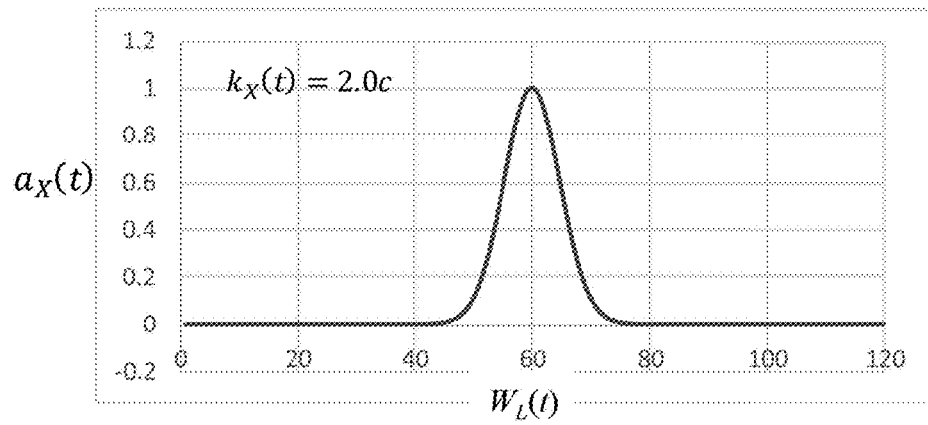
FIGS. 12A-12B are two-dimensional graphs of reliability information when the landmark is a little near landscape when viewed from the vehicle.
Figure 12B:
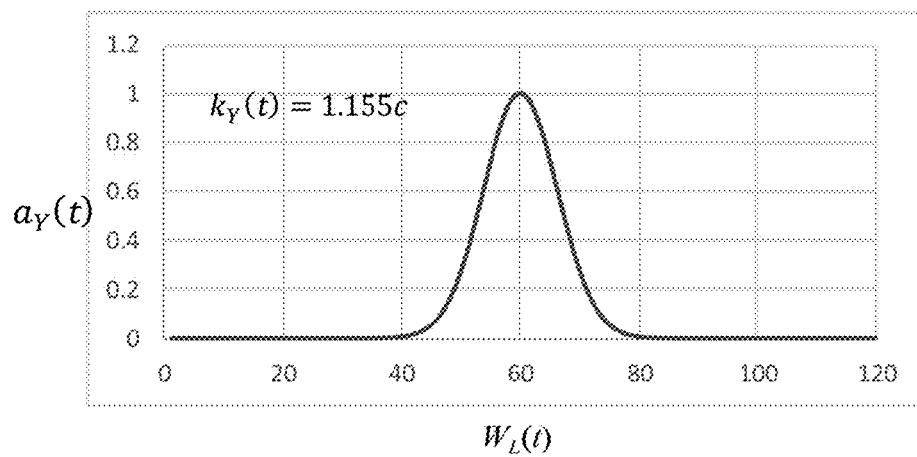

FIG. 12A is a two-dimensional graph showing the relation between the horizontal width $W_L(t)$ and the reliability information $a_X(t)$ based on the equation (3) when the vertical width $H_L(t)$ is fixed to 60 cm and the landmark has the horizontal width $W_M$ of 60 cm and the vertical width $H_M$ of 60 cm and the "$M_\psi-\psi^-$" is 60°. Further, FIG. 12B is a two-dimensional graph showing the relationship between the reliability information $a_Y(t)$ based on the equation (4) and the horizontal width $W_L(t)$ under the same conditions as FIG. 12A.

In the example of FIG. 12A, since "$M_\psi-\psi^-$" is 60°, the sensitivity factor $k_X$ is "2.0 c" based on the equation (5). On the other hand, in the case of FIG. 12B, the sensitivity coefficient $k_Y$ is "1.155 c" based on the equation (6). Thus, when the landmark is slightly turns sideways with respect to the vehicle, the sensitivity factor $k_X$ is greater than the sensitivity factor $k_Y$. Then, in this case, the sensitivity of the reliability information $a_X(t)$ to the deviation of the measured horizontal width $W_L(t)$ and the vertical width $H_L(t)$ to the horizontal width $W_M$ and the vertical width $H_M$ on the map is relatively higher than the sensitivity of the reliability information $a_Y(t)$.

[Kalman Gain According to Reliability Information]

Next, a method of setting the Kalman gain in accordance with the reliability information.

The vehicle position estimation unit 17 multiplies the diagonal component of the observation noise matrix R(t), that is used in calculating the Kalman gain K(t) according to the following general formula (7), by the inverses of the reliability information $a_X(t)$ and $a_Y(t)$, respectively.

$$K(t) = \overline{P}(t)H(t)^T\{H(t)\overline{P}(t)H(t)^T + R(t)\}^{-1} \quad (7)$$

Here, the observation noise matrix R(t) (also referred to as "modified observation noise matrix R(t)'") after the diagonal components are multiplied by the inverses of the reliability information $a_X(t)$ and $a_Y(t)$ is expressed by the following equation (8).

$$R(t)' = \begin{bmatrix} \frac{1}{a_X(t)} \times \sigma_{LX}(t)^2 & 0 \\ 0 & \frac{1}{a_Y(t)} \times \sigma_{LY}(t)^2 \end{bmatrix} \quad (8)$$

Thus, when the reliability information $a_X(t)$ and the reliability information $a_Y(t)$ are generated based on the equations (3) and (4), respectively, the factors by which the components of the observed noise matrix are multiplied are set individually. It is noted that, when calculating the reliability information a(t) based on the equation (2), the own vehicle position estimation unit 17 calculates the corrected observation noise matrix R(t)' by assuming "$a_X(t)=a_Y(t)=a(t)$" in the equation (8).

According to the equation (7), when the reliability information is the highest value "1", the inverse of it is also 1. In this case, the modified observation noise matrix R(t)' remains the original observation noise matrix R(t). On the other hand, when the reliability information is close to "0", its inverse becomes a value greater than 1. In this case, the diagonal components of the modified observation noise matrix R(t)' are multiplied.

Then, by using the modified observation noise matrix R(t)' shown in the equation (7), the own vehicle position estimation unit 17 calculates the adaptive Kalman gain "K(t)'" from the following equation (9).

$$K(t)' = \overline{P}(t)H(t)^T\{H(t)\overline{P}(t)H(t)^T + R(t)'\}^{-1} \quad (9)$$

Then, the own vehicle position estimation unit 17 calculates the estimated own vehicle position $X^-(t)$ obtained by correcting the predicted own vehicle position $X^-(t)$ based on the equation (1) using the Kalman gain K(t)' according to Equation (9). Therefore, when the reliability information is low, since the Kalman gain K(t)' is reduced, the correction amount for the predicted own vehicle position $X^-(t)$ is reduced. In this situation, since incorrect correction can be prevented, the accuracy of the estimated own vehicle position $X^-(t)$ is preferably improved.

The own vehicle position estimation unit 17 may multiply the Kalman gain K(t) by the inverses of the reliability information $a_X(t)$ and $a_Y(t)$ instead of multiplying the diagonal components of the observation noise matrix R(t) by the inverses of the reliability information $a_X(t)$ and $a_Y(t)$. In this case, the own vehicle position estimation unit 17 calculates the Kalman gain K(t)' based on the following equation (10).

$$K(t)' = [a_X(t)k_1(t) \quad a_Y(t)k_2(t)] = \begin{bmatrix} a_X(t)k_{11}(t) & a_Y(t)k_{12}(t) \\ a_X(t)k_{21}(t) & a_Y(t)k_{22}(t) \\ a_X(t)k_{31}(t) & a_Y(t)k_{32}(t) \end{bmatrix} \quad (10)$$

Even according to the equation (10), if the reliability information is low, the Kalman gain K(t)' is reduced and the correction amount for predicted own vehicle position $X^-(t)$ is reduced, which suitably prevents inaccurate correction.

Processing Flow

FIG. 13 is a flowchart of the own vehicle position estimation processing performed by the own vehicle position estimation unit 17 of the in-vehicle device 1. The in-vehicle device 1 repeatedly executes the processing of the flowchart indicated by FIG. 13. Here, as an example, an approach for calculating the reliability information $a_X(t)$ and $a_Y(t)$ for the travel direction and the lateral direction of the vehicle will be described.

First, the own vehicle position estimation unit 17 sets the initial value of the own vehicle position based on the output of the GPS receiver 5 or the like (step S101). Next, the own vehicle position estimation unit 17 acquires the vehicle body speed from the vehicle speed sensor 4 and acquires the angular velocity in the yaw direction from the gyro sensor 3 (step S102). Then, based on the obtained result of the step S102, the own vehicle position estimation unit 17 calculates the moving distance of the vehicle and the orientation change of the vehicle (step S103).

Then, the own vehicle position estimation unit 17 calculates the predicted own vehicle position $X^-(t)$ by adding the movement distance and the orientation change calculated at the step S103 to the estimated own vehicle position $X^-(t-1)$ at the preceding time (step S104). Furthermore, the own vehicle position estimation unit 17 refers to the feature information in the map DB10 based on the predicted own vehicle position $X^-(t)$ and searches for a landmark that is within the measurement range of the lidar 2 (step S105).

The vehicle position estimation unit 17 calculates the measurement prediction value $Z^-(t)$ from the position coordinates indicated by the predicted own vehicle position $X^-(t)$ and the feature information corresponding to the landmark searched for at step S105 (step S106) Furthermore, at step S106, the own vehicle position estimation unit 17 calculates the measurement value $Z(t)$ from the data measured by the lidar 2 with respect to the landmark searched for at step S105.

Then, the own vehicle position estimation unit 17 determines the sensitivity coefficient $k_X$ with respect to the traveling direction of the vehicle and the sensitivity coefficient $k_Y$ with respect to the lateral direction of the vehicle, respectively, based on the traveling direction of the vehicle corresponding to the orientation (yaw angle) $\psi^-$ of the vehicle indicated by the predicted own vehicle position $X^-(t)$ and the direction information corresponding to the landmark recorded on the map DB10 (step S107). In this case, for example, the own vehicle position estimation unit 17 calculates the sensitivity factor $k_X$ based on the equation (5), and calculates the sensitivity factor $k_Y$ based on the equation (6).

Next, with reference to the equation (3) and the equation (4), the own vehicle position estimation unit 17 calculates the reliability information $a_X(t)$ and $a_Y(t)$, respectively, based on: each difference between the horizontal width $W_M$ on the map and the measured horizontal width $W_L(t)$ and between the vertical width $H_M$ on the map and the measured vertical width $H_L(t)$ with respect to the landmark; and the sensitivity factors $k_X$ and $k_Y$ (step S108). Then, the own vehicle position estimation unit 17 generates the Kalman gain $K(t)'$ in accordance with the reliability information $a_X(t)$ and $a_Y(t)$ (step S109). For example, the own vehicle position estimation unit 17 calculates the modified observation noise matrix $R(t)'$ based on the equation (8) by using the reliability information $a_X(t)$ and $a_Y(t)$, and then calculates the Kalman gain $K(t)'$ based on the equation (9) Thereafter, the own vehicle position estimation unit 17 corrects the predicted own vehicle position $X^-(t)$ by using the Kalman gain $K(t)'$ in place of $K(t)$ in the equation (1) thereby to calculate the estimated own vehicle position $X^-(t)$ (step S110).

As described above, the own vehicle position estimation unit 17 of the in-vehicle device 1 according to the present embodiment acquires the point cloud data which is the measurement result of the landmark by the rider 2, and acquires the feature information associated with the landmark in the map DB10. Then, the own vehicle position estimation unit 17 calculates, on the basis of the difference between the size of the landmark specified based on the acquired point cloud data and the size of the landmark indicated by the feature information, calculates the reliability information indicative of the measurement accuracy of the landmark by the lidar 2. Thus, when calculating the estimated own vehicle position $X^-(t)$, the own vehicle position estimation unit 17 can accurately determine the correction amount for the predicted own vehicle position $X^-(t)$ according to the accuracy of the measurement result of the rider 2.

MODIFICATIONS

Hereinafter, preferred modifications of the embodiment will be described below. The following modifications may be applied to the embodiment in combination.

First Modification

Instead of using the equation (2), the own vehicle position estimation unit 17 may calculate the reliability information $a(t)$ based on the following equation (11) in which the absolute value $|W_L(t)-W_M|$ of the difference between the measured width and the width on the map and the absolute value $|H_L(t)-H_M|$ of the difference between the measured height and the height on the map.

$$a(t) = \exp\left\{-k\left(\frac{|W_L(t) - W_M|}{W_M} + \frac{|H_L(t) - H_M|}{H_M}\right)\right\} \quad (11)$$

The reliability information $a(t)$ based on the equation (11), as with the reliability information $a(t)$ based on the equation (2), is normalized so as to be a value range from 0 to 1, and the closer the measured horizontal width $W_L(t)$ and the measured vertical width $H_L(t)$ are to the horizontal width W M and the vertical width $H_M$ on the map, the closer the reliability information $a(t)$ is to the maximum value 1, and the farther the horizontal width $W_L(t)$ and the vertical width $H_L(t)$ are from the horizontal width $W_M$ and the vertical width $H_M$, the closer the reliability information $a(t)$ is to 0.

Figure 14A:
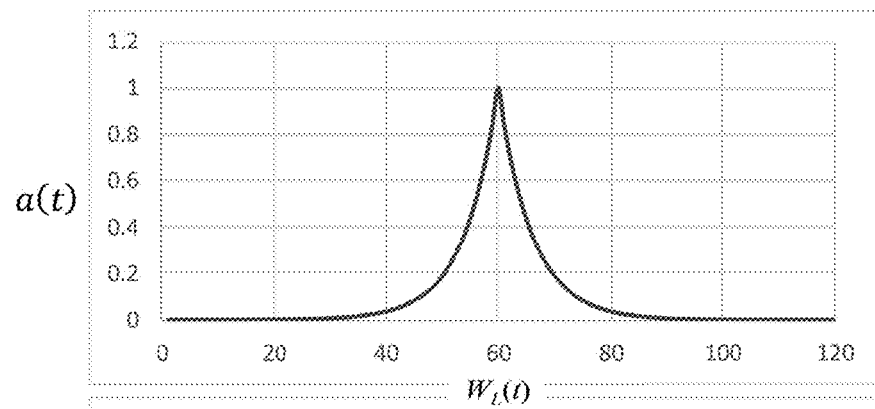
FIGS. 14A-14D illustrate graphs of reliability information according to a first modification.
Figure 14B:
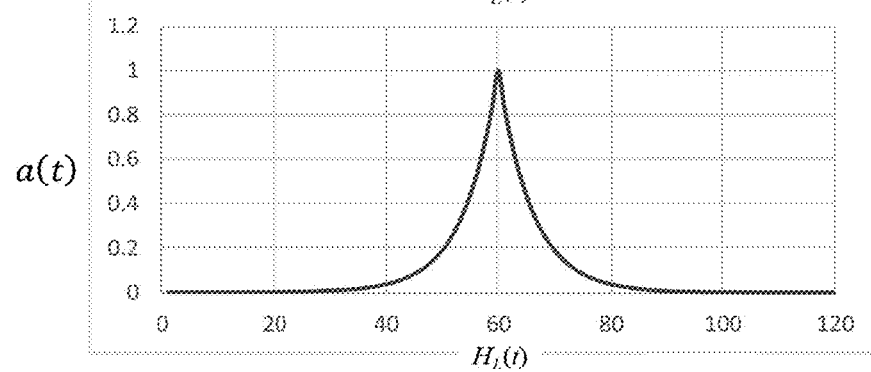
Figure 14C:
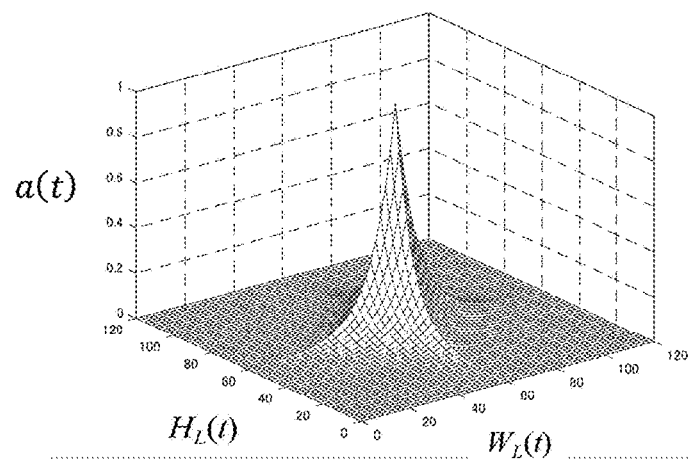

FIG. 14A is a two-dimensional graph showing the relation between the horizontal width $W_L(t)$ and the reliability information $a(t)$ based on the equation (11) when the landmark has the horizontal width $W_M$ of 60 cm and the vertical width $H_L$ of 60 cm and the measured vertical width $H_L(t)$ is fixed to 60 cm. Further, FIG. 14B is a two-dimensional graph showing the relation between the reliability information $a(t)$ based on the equation (11) and the vertical width $H_L(t)$ when the horizontal width $W_L(t)$ measured with respect to the same landmark as FIG. 14A is fixed to 60 cm. Further, FIG. 14C is a three-dimensional graph showing the relation between the horizontal width $W_L(t)$ and the vertical width $H_L(t)$ and the reliability information $a(t)$ based on the equation (11) with respect to the same landmark as FIGS. 14A and 14B. Further, FIG. 14 (D) is a graph showing the inverse of the reliability information $a(t)$ in FIG. 14A.

Figure 14D:
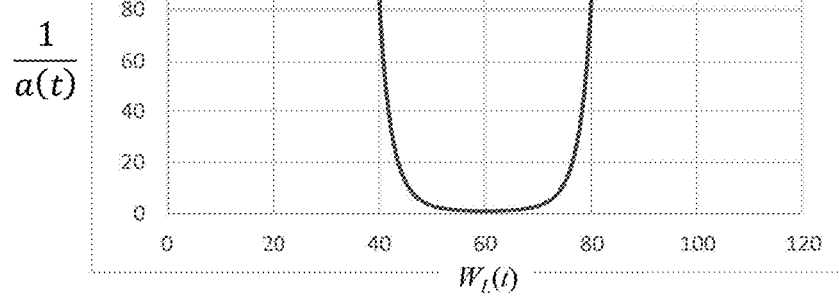

As shown in FIGS. 14A and 14C, the reliability information $a(t)$ approaches 1 as the horizontal width $W_L(t)$ approaches the horizontal width $W_M$ of 60 cm. On the other hand, as shown in FIG. 14B and FIG. 14C, the reliability information a(t) approaches 1 as the vertical width $H_L(t)$ approaches the vertical width $H_M$ of 60 cm. Further, as shown in FIG. 14D, the inverse of the reliability information a(t) approaches 1 as the horizontal width $W_L(t)$ approaches the horizontal width $W_M$ while the inverse of the reliability information a(t) increases with increasing difference between the horizontal width $W_L(t)$ and the horizontal width $W_M$. Similarly, the inverse of the reliability information a(t) approaches 1 as the vertical width $H_L(t)$ approaches the vertical width $H_M$ while the inverse of the reliability information a(t) increases with increasing difference between the vertical width $H_L(t)$ and the vertical width $H_M$.

Thus, the reliability information a(t) based on the equation (11), similarly to the reliability information a(t) based on the equation (2), has the maximum value of 1, and decreases with increase in each difference between the measured horizontal width and the horizontal width on the map and between the measured vertical width and the vertical width on the map. Therefore, by calculating the modified observation noise matrix R(t)' based on the equation (8) using the inverse of the reliability information a(t) based on the equation (11), the own vehicle position estimation unit 17 can suitably determine the correction amount for the predicted own vehicle position $X^-(t)$ to be used in calculating the estimated own vehicle position $X^-(t)$.

As in the embodiment, the own vehicle position estimation unit 17 may calculate the reliability information $a_X(t)$ and the reliability information $a_Y(t)$ for the driving direction and the horizontal direction of the vehicle. In this case, the own vehicle position estimation unit 17 calculates the sensitivity factors $k_X$, $k_Y$ based on the equations (5) and (6), and thereby calculates the reliability information $a_X(t)$ and the reliability information $a_Y(t)$, respectively.

Second Modification

The vehicle position estimation unit 17, instead of using the equation (2), may determine the reliability information a(t) so that the reliability information a(t) approaches the minimum value of 1 with increasing reliability while it increases with decreasing reliability.

For example, the own vehicle position estimation unit 17 calculates the reliability information a(t) based on the following equation (12)

$$a(t) = \frac{1}{2}\left\{\exp\left(k\frac{|W_L(t) - W_M|}{W_M}\right) + \exp\left(k\frac{|H_L(t) - H_M|}{H_M}\right)\right\} \quad (12)$$

The reliability information a(t) based on the equation (12) is normalized so as to be a value range of 1 or more, and it approaches 1 that is the minimum value as the horizontal width $W_L(t)$ and the vertical width $H_L(t)$ become close to the horizontal width $W_M$ and the vertical width $H_M$ on the map while it increases as the horizontal width $W_L(t)$ and the vertical width $H_L(t)$ become away from the horizontal width $W_M$ and the vertical width $H_M$ on the map.

Figure 15A:
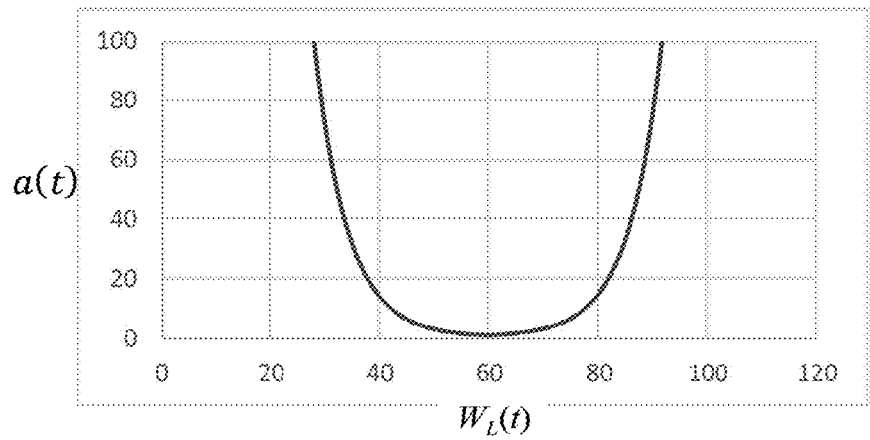
FIGS. 15A-15C illustrate graph of reliability information according to a second modification.
Figure 15B:
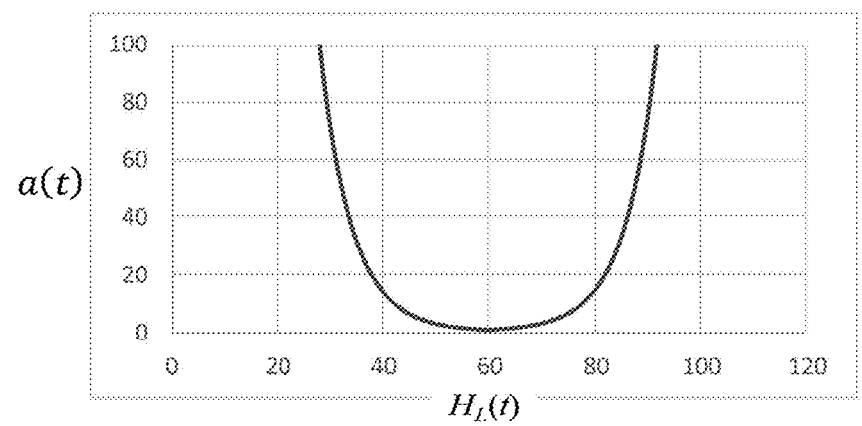

FIG. 15A is a two-dimensional graph showing the relation between the horizontal width $W_L(t)$ and the reliability information a(t) based on the equation (12) when the measured landmark has the horizontal width $W_M$ of 60 cm and the vertical width $H_M$ of 60 cm and the vertical width $H_L(t)$ is fixed to 60 cm. Further, FIG. 15B is a two-dimensional graph showing the relation between the vertical width $H_L(t)$ and the reliability information a(t) based on the equation (12) when the horizontal width $W_L(t)$ measured with respect to the same landmark as FIG. 15A is fixed to 60 cm. Further, FIG. 15C is a three-dimensional graph showing the relation among the horizontal width $W_L(t)$ and the vertical width $H_L(t)$ and the reliability information a(t) based on the equation (12) with respect to the same landmark as FIGS. 15A and 15B.

Figure 15C:
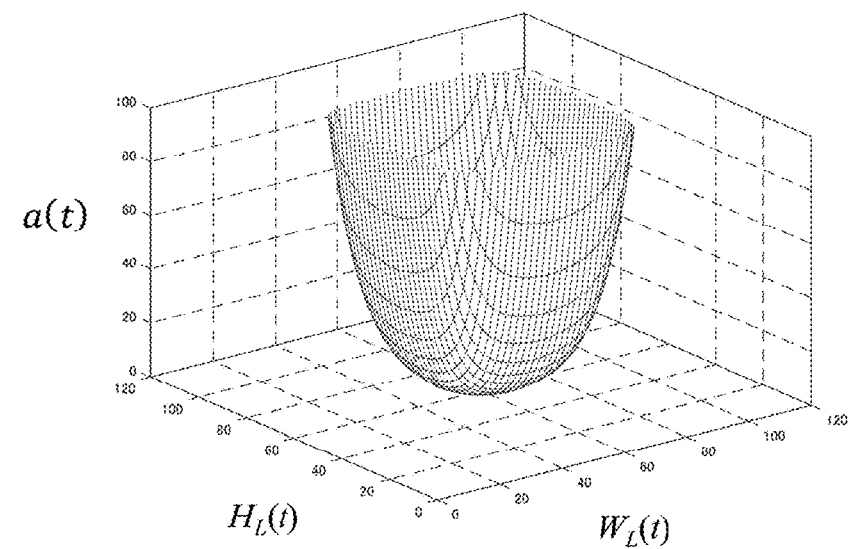

As shown in FIG. 15A and FIG. 15C, the reliability information a(t) approaches 1, which is the smallest value, as the horizontal width $W_L(t)$ approaches 60 cm, which is a horizontal width $W_M$ while the reliability information a(t) increases with increasing deviation of the horizontal width $W_L(t)$ to the horizontal width $W_M$. Similarly, as shown in FIGS. 15B and 15C, the reliability information a(t) approaches 1, which is the smallest value, as the vertical width $H_L(t)$ approaches 60 cm, which is a vertical width $H_M$, and the reliability information a(t) increases with increasing deviation of the vertical width $H_L(t)$ to the vertical width $H_M$.

As in the embodiment, the own vehicle position estimation unit 17 may calculate the reliability information $a_X(t)$ and the reliability information $a_Y(t)$ for the driving direction and the horizontal direction of the vehicle. In this case, the own vehicle position estimation unit 17 calculates the sensitivity factors $k_X$ and $k_Y$ based on the equations (5) and (6), and thereby calculates the reliability information $a_X(t)$ and the reliability information $a_Y(t)$, respectively.

Further, the reliability information a (t) based on the equation (12) is the same as the inverse of the reliability information a(t) based on the equation (2) (see FIG. 7D) wherein the minimum value is set to 1 and it increases with increase in the deviation of the horizontal width $W_L(t)$ to the horizontal width $W_M$ or the deviation of the vertical width $H_L(t)$ to the vertical width $H_M$. Thus, the own vehicle position estimation unit 17 does not need to calculate the inverse of the reliability information a(t) when multiplying the diagonal components of the observation noise matrix R(t). Specifically, after the reliability information $a_X(t)$ and the reliability information $a_Y(t)$ are respectively calculated, the own vehicle position estimation unit 17 may calculate the modified observation noise matrix R(t)' based on the following equation (13).

$$R(t)' = \begin{bmatrix} a_X(t) \times \sigma_{LX}(t)^2 & 0 \\ 0 & a_Y(t) \times \sigma_{LY}(t)^2 \end{bmatrix} \quad (13)$$

As a result, as in the embodiment, the own vehicle position estimation unit 17 can preferably determine the correction amount for the predicted own vehicle position $X^-(t)$ when calculating the estimated own vehicle position $X^-(t)$.

Third Modification

The configuration of the driving support system shown in FIG. 1 is an example and the configuration of the driving support system to which the present invention is applicable is not limited to the configuration shown in FIG. 1. For example, the driving support system, instead of having the in-vehicle device 1, may execute the process of the own vehicle position estimation unit 17 of the in-vehicle device 1 through the electronic control device of the vehicle. In this case, the map DB10 is stored, for example, on the memory (storage unit) in the vehicle, and the electronic control device of the vehicle calculates the estimated own vehicle position by executing the process of the flow chart shown in FIG. 13.

Fourth Modification

The reliability information is not limited to being used as a parameter for determining the correction amount for the predicted own vehicle position X⁻(t) when calculating the estimated own vehicle position X⁻(t). Instead, for example, the in-vehicle device 1 may use the calculated reliability information in other applications such as obstacle detection based on the point cloud data outputted by the lidar 2.

BRIEF DESCRIPTION OF REFERENCE NUMBERS

1 In-vehicle device
2 Lidar
3 Gyro sensor
4 Vehicle speed sensor
5 GPS receiver
10 Map DB

The invention claimed is:

1. A measurement accuracy calculation device comprising:
a first acquisition unit configured to acquire a measurement result of a feature by a measurement unit;
a second acquisition unit configured to acquire feature information associated with the feature included in map data; and
a calculation unit configured to calculate, on a basis of a difference between a measured size, at least based on a horizontal width, of the feature and a size of the feature indicated by the feature information, accuracy information indicative of measurement accuracy of the feature by the measurement unit,
wherein, based on a result of the calculated accuracy information, driving assistance of a moving object is controlled,
wherein the calculation unit generates the accuracy information based on an orientation of the feature indicated by the feature information, and
wherein the calculation unit generates the accuracy information indicative of the measurement accuracy of the feature for each of a traveling direction and a lateral direction of the moving object on a basis of the difference, the traveling direction of the moving object, and a normal direction of the feature indicated by the feature information.

2. The measurement accuracy calculation device according to claim 1, wherein the calculation unit generates the accuracy information whose measurement accuracy decreases with increase in the difference.

3. The measurement accuracy calculation device according to claim 1, wherein the calculation unit decreases, with increase in an angle difference between the traveling direction and the normal direction of the feature, a degree of influence of the difference on the measurement accuracy with respect to the lateral direction, and
wherein the calculation unit decreases, with increase in the angle difference, the degree of influence of the difference on the measurement accuracy with respect to the traveling direction.

4. The measurement accuracy calculation device according to claim 1, further comprising:

a third acquisition unit configured to acquire a predicted position information indicative of a predicted self-position; and
a correction unit configured to correct the predicted self-position based on the accuracy information.

5. The measurement accuracy calculation device according to claim 4, wherein the correction unit determines, on a basis of the accuracy information, a gain for a difference value between:
a measurement distance by the measurement unit from a moving object to the feature and a predicted distance from the moving object to the feature; and
a predicted distance, predicted based on position information of the feature included in the feature information, from the moving object to the feature based on the position information of the feature included in the feature information,
the predicted self-position being corrected by the difference value.

6. A control method to be executed by a measurement accuracy calculation device, the control method comprising:
acquiring a measurement result of a feature by a measurement unit;
acquiring feature information associated with the feature included in map data; and
calculating, on a basis of a difference between a measured size, at least based on a horizontal width, of the feature and a size of the feature indicated by the feature information, accuracy information indicative of measurement accuracy of the feature by the measurement unit,
wherein, based on a result of the calculated accuracy information, driving assistance of a vehicle is controlled,
wherein, in the calculating, accuracy information is generated based on an orientation of the feature indicated by the feature information, and
wherein the calculating includes generating the accuracy information indicative of the measurement accuracy of the feature for each of a traveling direction and a lateral direction of a moving object on a basis of the difference, the traveling direction of the moving object, and a normal direction of the feature indicated by the feature information.

7. A non-transitory computer readable medium including instructions to be executed by a computer, instructions comprising:
acquiring a measurement result of a feature by a measurement unit;
acquiring feature information associated with the feature included in map data; and
calculating, on a basis of a difference between a measured size, at least based on a horizontal width, of the feature and a size of the feature indicated by the feature information, accuracy information indicative of measurement accuracy of the feature by the measurement unit,
wherein, based on a result of the calculated accuracy information, driving assistance of a vehicle is controlled,
wherein, in the calculating, accuracy information is generated based on an orientation of the feature indicated by the feature information, and
wherein the calculating includes generating the accuracy information indicative of the measurement accuracy of the feature for each of a traveling direction and a lateral direction of a moving object on a basis of the difference, the traveling direction of the moving object, and a normal direction of the feature indicated by the feature information.

* * * * *